(12) United States Patent
Kurita et al.

(10) Patent No.: US 11,399,210 B2
(45) Date of Patent: *Jul. 26, 2022

(54) METHOD FOR PROCESSING VIDEO INFORMATION AND METHOD FOR DISPLAYING VIDEO INFORMATION

(71) Applicant: MAXELL, LTD., Kyoto (JP)

(72) Inventors: Toshiyuki Kurita, Yokohama (JP);
Hitoaki Owashi, Yokohama (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,724

(22) Filed: Feb. 7, 2019

(65) Prior Publication Data

US 2019/0174179 A1  Jun. 6, 2019

Related U.S. Application Data

(63) Continuation of application No. 15/891,085, filed on Feb. 7, 2018, now Pat. No. 10,244,284, which is a
(Continued)

(30) Foreign Application Priority Data

Nov. 28, 2007 (JP) ................................. 2007-306750

(51) Int. Cl.
*H04N 21/4363* (2011.01)
*H04L 69/14* (2022.01)
(Continued)

(52) U.S. Cl.
CPC ....... *H04N 21/43637* (2013.01); *H04L 69/14* (2013.01); *H04N 5/44* (2013.01);
(Continued)

(58) Field of Classification Search
CPC ....... H04N 21/43637; H04N 21/41407; H04N 21/4122; H04N 5/44; H04N 21/4367; H04L 69/14
See application file for complete search history.

(56) References Cited

U.S. PATENT DOCUMENTS 4,561,100 A    12/1985  Asao et al.
5,678,173 A    10/1997  Mihara
(Continued)

FOREIGN PATENT DOCUMENTS

CN    1336768 A    2/2002
CN    1428031 A    7/2003
(Continued)

OTHER PUBLICATIONS

Office Action, dated Jun. 7, 2018, which issued during the prosecution of Chinese Patent Application No. 201510969210.6, which corresponds to the present application.
(Continued)

*Primary Examiner* — Mekonnen D Dagnew
(74) *Attorney, Agent, or Firm* — Mattingly & Malur, PC

(57) ABSTRACT

While presenting on a display apparatus videos of high picture quality obtained from portable video processing apparatuses such as a camera and a cellular, it is possible to communicate with the Internet and/or a home network. A display apparatus includes a first radio communication unit capable of receiving video information by radio from an external video processing apparatus, a second radio communication unit capable of connecting by radio to a network, and a control unit for controlling assignment of connection by radio transmission for each of the first and second radio communication units. The control unit assigns connection of the first radio communication unit with higher priority and controls the assignment of the transmission rate such that the transmission rate between the first radio communication unit
(Continued)

and the external video processing apparatus is more than that between the second radio communication unit and the network.

24 Claims, 9 Drawing Sheets

Related U.S. Application Data continuation of application No. 15/208,886, filed on Jul. 13, 2016, now Pat. No. 10,129,590, which is a continuation of application No. 12/260,410, filed on Oct. 29, 2008, now Pat. No. 9,420,212.

(51) Int. Cl.
  *H04N 21/41* (2011.01)
  *H04N 21/414* (2011.01)
  *H04N 5/44* (2011.01)
  *H04N 21/4367* (2011.01)

(52) U.S. Cl.
  CPC ... *H04N 21/4122* (2013.01); *H04N 21/41407* (2013.01); *H04N 21/4367* (2013.01)

(56) References Cited

U.S. PATENT DOCUMENTS

| | | | |
|---|---|---|---|
| 5,724,355 A * | 3/1998 | Bruno | H04L 12/6418 370/401 |
| 5,758,262 A | 5/1998 | Grysiewicz et al. | |
| 5,838,384 A | 11/1998 | Schindler et al. | |
| 6,037,991 A | 3/2000 | Thro et al. | |
| 6,763,226 B1 | 7/2004 | McZeal, Jr. | |
| 6,957,081 B2 | 10/2005 | Leyh et al. | |
| 7,224,964 B2 | 5/2007 | Souissi et al. | |
| 7,233,359 B2 | 6/2007 | Suda | |
| 7,668,565 B2 | 2/2010 | Ylanen et al. | |
| 7,787,882 B2 | 8/2010 | Feher | |
| 7,970,350 B2 | 6/2011 | Sheynman et al. | |
| 7,978,774 B2 | 7/2011 | Feher | |
| 7,983,678 B2 | 7/2011 | Feher | |
| 8,045,922 B2 | 10/2011 | Sherman et al. | |
| 8,306,525 B2 | 11/2012 | Feher | |
| 8,311,509 B2 | 11/2012 | Feher | |
| 8,325,237 B2 | 12/2012 | Bessone et al. | |
| 8,572,257 B2 | 10/2013 | Dua | |
| 8,625,547 B1 | 1/2014 | Miller, II | |
| 8,693,950 B2 | 4/2014 | Desai | |
| 9,344,237 B2 | 5/2016 | Margulis | |
| 2003/0188322 A1 | 10/2003 | Bontempi | |
| 2003/0189638 A1 | 10/2003 | Fry | |
| 2004/0045030 A1 | 3/2004 | Reynolds et al. | |
| 2004/0048572 A1 | 3/2004 | Godfrey | |
| 2004/0077313 A1 | 4/2004 | Oba et al. | |
| 2004/0107208 A1 * | 6/2004 | Seet | H04L 69/329 |
| 2004/0193647 A1 | 9/2004 | Ueda et al. | |
| 2004/0215769 A1 | 10/2004 | Yoshida et al. | |
| 2005/0014532 A1 * | 1/2005 | Immendorf | H04W 28/18 455/557 |
| 2005/0034169 A1 | 2/2005 | Maeda et al. | |
| 2005/0062945 A1 | 3/2005 | Shin-Pin | |
| 2005/0064860 A1 | 3/2005 | Deline | |
| 2005/0130586 A1 | 6/2005 | Gnuschke et al. | |
| 2005/0136949 A1 | 6/2005 | Barnes | |
| 2005/0144478 A1 | 6/2005 | Yamanaka et al. | |
| 2005/0190747 A1 | 9/2005 | Sindhwani et al. | |
| 2005/0215284 A1 | 9/2005 | Su et al. | |
| 2005/0249245 A1 | 11/2005 | Hazani et al. | |
| 2006/0025674 A1 | 2/2006 | Kiraly et al. | |
| 2006/0097955 A1 | 5/2006 | Kato | |
| 2006/0128425 A1 | 6/2006 | Rooyen | |
| 2006/0133418 A1 | 6/2006 | Anand | |
| 2006/0135076 A1 * | 6/2006 | Honkanen | H04B 1/1027 455/67.13 |
| 2006/0203758 A1 * | 9/2006 | Tee | H04W 88/04 370/315 |
| 2006/0256747 A1 | 11/2006 | Jaakkola | |
| 2006/0258289 A1 | 11/2006 | Dua | |
| 2007/0006255 A1 | 1/2007 | Cain | |
| 2007/0021140 A1 | 1/2007 | Keyes, IV et al. | |
| 2007/0070960 A1 | 3/2007 | Barak et al. | |
| 2007/0072642 A1 * | 3/2007 | Kangas | H04M 1/72522 455/552.1 |
| 2007/0085933 A1 | 4/2007 | Takagi et al. | |
| 2007/0086724 A1 * | 4/2007 | Grady | H04N 21/482 386/230 |
| 2007/0091835 A1 * | 4/2007 | Jo | H04H 60/11 370/315 |
| 2007/0094691 A1 | 4/2007 | Gazdzinski | |
| 2007/0109973 A1 | 5/2007 | Trachewsky | |
| 2007/0123163 A1 | 5/2007 | Matsubara | |
| 2007/0165754 A1 | 7/2007 | Kiukkonen et al. | |
| 2007/0184785 A1 * | 8/2007 | Yoshida | H04B 1/38 455/73 |
| 2007/0223505 A1 | 9/2007 | Itai et al. | |
| 2007/0238482 A1 | 10/2007 | Rayzman et al. | |
| 2007/0242313 A1 | 10/2007 | Shiomi | |
| 2007/0265034 A1 | 11/2007 | Kasslin et al. | |
| 2007/0275746 A1 | 11/2007 | Bitran | |
| 2008/0025273 A1 | 1/2008 | Sano | |
| 2008/0081663 A1 | 4/2008 | Kasslin et al. | |
| 2008/0101446 A1 | 5/2008 | Gautier et al. | |
| 2008/0109307 A1 | 5/2008 | Ullah | |
| 2008/0139118 A1 * | 6/2008 | Sanguinetti | H04B 1/406 455/41.2 |
| 2008/0188182 A1 | 8/2008 | Macholz | |
| 2008/0201751 A1 | 8/2008 | Ahmed et al. | |
| 2008/0229369 A1 * | 9/2008 | Lewis | H04N 7/17318 725/78 |
| 2008/0291839 A1 | 11/2008 | Hooper et al. | |
| 2008/0304431 A1 | 12/2008 | Karaoguz | |
| 2009/0091663 A1 | 4/2009 | Toh et al. | |
| 2009/0103518 A1 | 4/2009 | Yu et al. | |
| 2009/0135307 A1 * | 5/2009 | Kurita | H04N 21/4122 348/729 |

FOREIGN PATENT DOCUMENTS

| | | |
|---|---|---|
| CN | 1585403 A | 2/2005 |
| CN | 1588997 | 3/2005 |
| CN | 1791092 A | 6/2006 |
| CN | 1984481 A | 6/2007 |
| EP | 1334617 A2 | 8/2003 |
| EP | 1 708 467 A1 | 10/2006 |
| EP | 2 019 560 A1 | 1/2009 |
| EP | 1 747 616 B1 | 1/2016 |
| JP | 2002-135304 | 5/2002 |
| JP | 2007-202115 | 8/2007 |
| JP | 2007-258865 | 10/2007 |
| JP | 2007-282097 | 10/2007 |
| JP | 2008-035420 | 2/2008 |
| KR | 2002-0016101 A | 3/2002 |
| WO | WO 01/93505 A2 | 12/2001 |
| WO | 2005060127 A1 | 6/2005 |
| WO | 2006/098825 A2 | 9/2006 |
| WO | 2007/010444 A1 | 1/2007 |
| WO | 2007/069210 A2 | 6/2007 |
| WO | 2007/091202 A2 | 8/2007 |
| WO | 2008/072057 A2 | 6/2008 |

OTHER PUBLICATIONS

Kazantzidis, M. et al., "Bluetooth: An Enabler for Personal Area Networking," Per Johansson, Ericsson Research, 2001, UCLA.

Hypertext Transfer Protocol—HTTP/1.2 RFC2068, 1997.

Martyn Mallick, Mobile and Wireless Design Essentials, John Wiley & Sons 2003.

TCP Keepalive HOWTO, Rev. 1.0, Keepalive Overview, May 4, 2007.

FCC Part 15 Test Report for the Apple Airport Extreme and Bluetooth 2.0+EDR Module, Mar. 31, 2005.

(56) References Cited

OTHER PUBLICATIONS

Transmission Control Protocol, RFC 793, Sep. 1981.
Mac G5 User's Guide, Copyright 2005.
Apple AirPort Extreme and Apple Bluetooth 2.0+EDR, Copyright 2005.
MacBook Pro User's Guide, Copyright 2006.
Mallick, M., "Mobile and Wireless Design Essentials", 2003, pp. 1-352.
Apostolopoulos, J. G., et al., "Video Streaming: Concepts, Algorithms, and Systems", Sep. 18, 2002, pp. 1-34.
Newton, H., "Newton's Telecom Dictionary 20th Update and Expanded Edition", CMP Books, 2004, pp. 130, 533 and 675-676.
Ribas-Corbera, J., et al., "A Flexible Decoder Buffer Model For JVT Video Coding", IEEE ICIP 2002, pp. 493-496.
Sheu, T. et al., "A Buffer Allocation Mechanism for VBR Video Playback", IEEE 2000, pp. 1641-1644.
*Apple Inc.v. Maxell, Ltd.*, Petition for Inter Partes Review of U.S. Pat. No. 10,159,590, Inter Partes Review No. PR2021-00400 filed Jan. 12, 2021.
Request for Ex Parte Reexamination of U S. Patent No. 10,129,590 Under 35 U.S.C. 302 and 37 CFR 1.510 filed Jan. 12, 2021.
Lenovo Group Ltd., Lenovo (United States) Inc., and Motorola Mobility LLC's Invalidity Contentions which were filed in the following litigation: *Maxell, Ltd.v. Lenovo Group Ltd., Lenovo (United States) Inc., and Motorola Mobility LLC.*, Civil Action No. 6:2l-cv-01169-ADA, filed Apr. 4, 2022.
Motorola Q9h and contemporaneously available Cellular, Wi-Fi, and/or Bluetooth-enabled computers, Copyright 2007.

\* cited by examiner

FIG. 9
| SCHEME | SCHEME 1 | SCHEME 2 |
|---|---|---|
| BANDWIDTH | 6MHz | 6MHz |
| CARRIER MODULATION SCHEME | 64QAM | QPSK |
| CONVOLUTION CODE | 3/4 | 2/3 |
| GUARD INTERVAL | 1/8 | 1/8 |
| TRANSMISSION CAPACITY | 17Mbps | 5Mbps |
FIG. 10
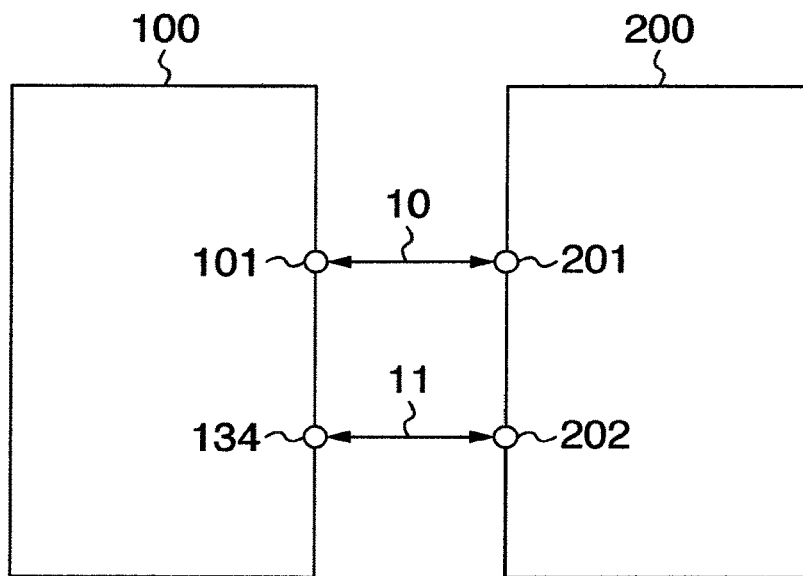
FIG. 11
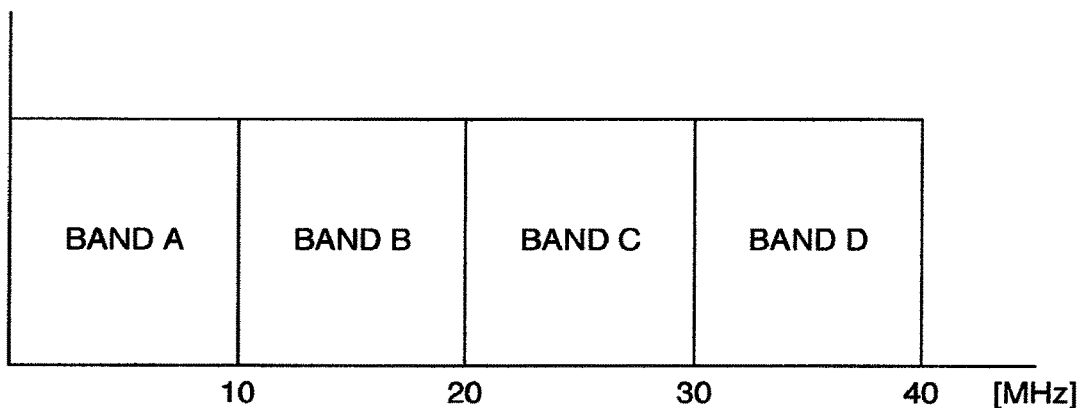

METHOD FOR PROCESSING VIDEO INFORMATION AND METHOD FOR DISPLAYING VIDEO INFORMATION

INCORPORATION BY REFERENCE

The present application is a continuation of U.S. patent application Ser. No. 15/891,085, filed on Feb. 7, 2018, which is a continuation of U.S. patent application Ser. No. 15/208, 886, filed on Jul. 13, 2016 (now, U.S. Pat. No. 10,129,590), which is a continuation of U.S. patent application Ser. No. 12/260,410, filed on Oct. 29, 2008 (now, U.S. Pat. No. 9,420,212), which claims priority to Japanese Patent Application No. 2007-306750, filed on Nov. 28, 2007, the contents of all of which are hereby incorporated by reference into this application.

BACKGROUND OF THE INVENTION

The present invention relates to a technique to establish connections between a plurality of apparatuses and networks by radio.

To connect a video processing apparatus to a video display apparatus as another video processing apparatus to view videos, there has been employed a method to establish analog connections therebetween to transmit video and audio signals. However, as digital apparatuses have been widely spread, there is employed, to prevent picture quality deterioration and to protect copyright of contents to be viewed, a method in which digital connections are established between the apparatuses and video and audio signals are encrypted to be transmitted therebetween.

High Definition Digital Multimedia Interface (HDMI) is known as an example of an interface for digital transmission. According to the HDMI, the base band signal and the audio signal of high definition are time-division multiplexed and the resultant signal is encrypted through HDCP for transmission thereof.

A conventional technique in which digitized video and audio signals are multiplexed for transmission as above is described in, for example, JP-A-2007-202115.

SUMMARY OF THE INVENTION

According to the HDMI, which is developed on assumption of uses for connections between apparatuses installed in a house of a family, consideration has not been given to connections with the internet and a network in the family or a home network while viewing high-quality videos. It is therefore an object of the present invention, devised to overcome the difficulty, to provide a technique wherein while presenting on a display apparatus videos of high picture quality obtained from portable video processing apparatuses such as a camera and a cellular phone, it is possible to communicate with the internet and/or a home network.

According to one aspect of the resent invention, there is provided a display apparatus including a first radio communication unit capable of receiving video information by radio from an external video processing apparatus, a second radio communication unit capable of connecting by radio to a network, and a connection assignment control unit for controlling assignment of connection by radio transmission for each of the first and second radio communication units. The control unit assigns connection of the first radio communication unit with higher priority and controls the assignment of the transmission rate, for example, such that the transmission rate between the first radio communication unit and the external video processing apparatus is more than the transmission rate between the second radio communication unit and the network.

According to another aspect of the present invention, there is provided a video processing apparatus including a first radio communication unit capable of transmitting video information by radio to an external display apparatus, a second radio communication unit capable of connecting by radio to a network, and a connection assignment control unit for controlling assignment of connection by radio transmission for each of the first and second radio communication units. The control unit assigns connection of the first radio communication unit with higher priority and controls the assignment of the transmission rate, for example, such that the transmission rate between the first radio communication unit and the external video display apparatus is more than the transmission rate between the second radio communication unit and the network.

In the display apparatus constructed as above, the first radio communication unit can communicate video information of high picture quality with an external video processing apparatus. The second radio communication unit can connect by radio to the internet and a home network. The controller controls the transmission rate of the radio transmitter module to be assigned to the first radio communication unit and can change the transmission rate of the radio transmitter module to be assigned to the second radio communication unit. It is possible for the controller to determine and to control the radio transmission rates to be assigned to the first and second radio communication units. The controller controls the operation such that the assignment to the first radio communication module to conduct transmission to receive video information from an external video processing apparatus is carried out with higher priority. Therefore, it is possible that video information of high picture quality is continuously fed from the video processing apparatus to the video information apparatus as well as information is transmitted from the internet and a home network. There can be hence provided a video display apparatus having high serviceability.

According to the present invention, it is possible to communicate with a network while displaying videos of high picture quality obtained by a video processing apparatus.

Other objects, features and advantages of the invention will become apparent from the following description of the embodiments of the invention taken in conjunction with the accompanying drawings.

BRIEF DESCRIPTION OF THE DRAWINGS

FIG. 9 shows a diagram showing an example of transmission parameters of a radio modem in the embodiment;

FIG. 10 is a diagram showing connections between the video processing apparatus 100 and the video display apparatus 200 in the embodiment of the present invention; and FIG. 11 is a diagram showing an example of assignment of bands in another example of a radio modem shown in FIGS. 4 and 8.

DETAILED DESCRIPTION OF THE EMBODIMENTS

Figure 1:
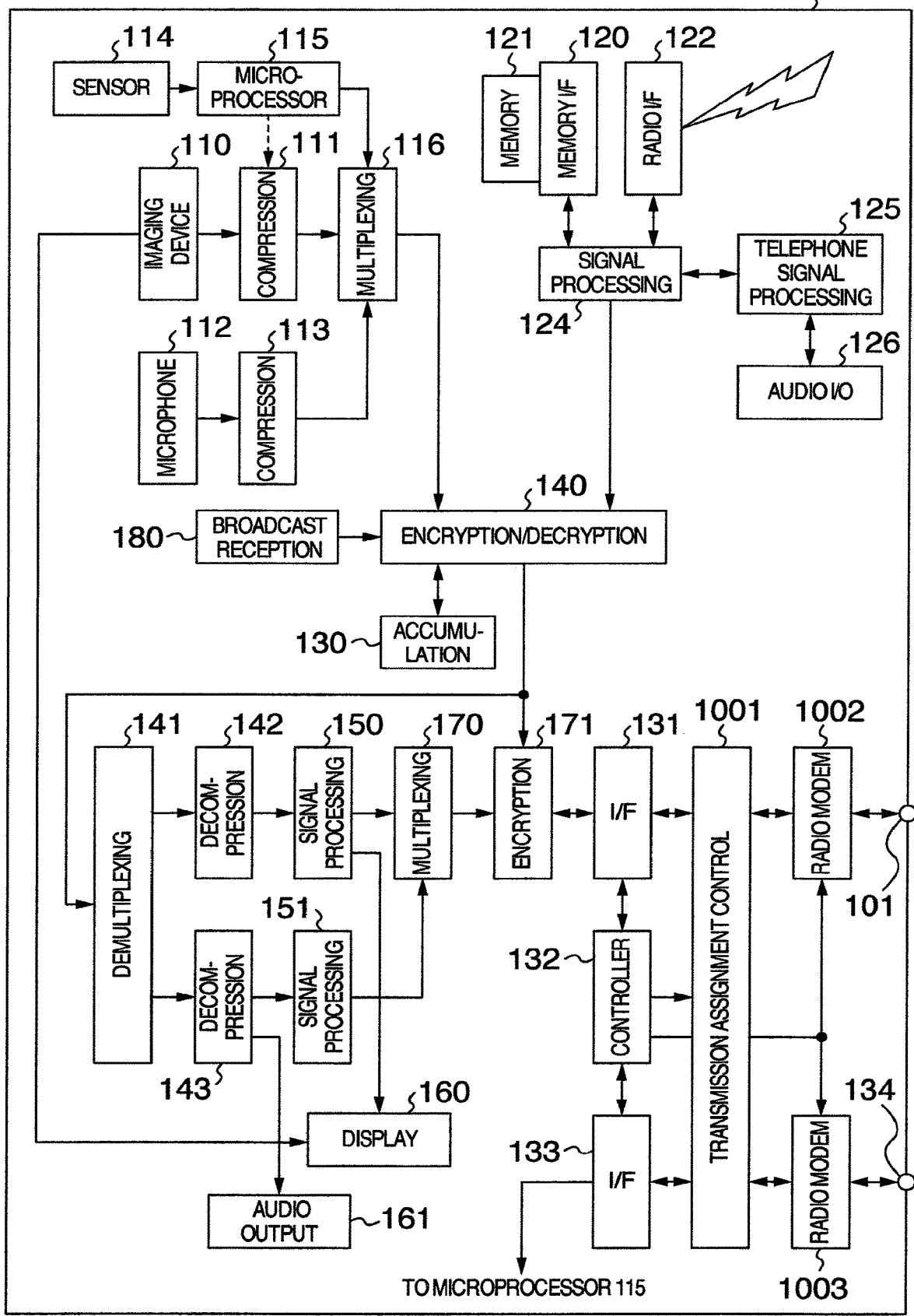
FIG. 1 is a diagram showing an example of an embodiment of a video processing apparatus 100 according to the present invention.

Referring now to the drawings, description will be given of an embodiment according to the present invention.

First Embodiment

FIG. 10 shows an embodiment of the present invention. In this example, the system includes two video processing apparatuses, i.e., a video processing apparatus 100 which is, for example, a portable video processing apparatus capable of receiving a digital broadcast signal via a base station antenna for cellular phones or a broadcast transmission tower and a video display apparatus 200 such as a tuner capable of receiving a digital broadcast signal from a broadcast transmission tower. These apparatuses are connected, for example, via a bidirectional interface 10 to each other. Resultantly, a video signal of high picture quality and other information items and signals can be bidirectionally communicated therebetween. On the other hand, between a terminal 134 of the video processing apparatus 100 and a terminal 202 of the video display apparatus 200, signals from the internet and a home network are communicated by radio. The frequency bands used for the transmission between the terminals 134 and 202 are limited to predetermined frequency bands. This increases the radio wave resource efficiency and prevents the problem of interference with other apparatuses.

In the embodiment, the portable video processing apparatus 100 is specifically, for example, a digital camera, a video camera, a cellular phone, a game machine, or a personal media player.

FIG. 1 shows a concrete example of the video processing apparatus 100 employed in the first embodiment of the present invention. This is a specific configuration of the apparatus 100 shown in FIG. 10. In FIG. 1, an imaging device 110 receives a moving or still picture supplied via an optical system to convert the picture into en electric signal. To transmit a moving picture, a compression circuit 111 employs a compression method, e.g., Moving Picture Experts Group 2 (MPEG2), MPEG4, or AVC/H.264. To transmit a still picture, the compression circuit 111 employs a compression method, e.g., Joint Photographic Experts Group (JPEG). The compression circuit 111 efficiently bit-compresses the received image.

A microphone 112 converts sound into an electric signal. A compression circuit 113 uses a compression method such as an MPEG audio to efficiently bit-compress the received audio signal.

A multiplexer circuit 116 receives the bit-compressed video and audio signals from the compression circuits 111 and 113 and various information items from a microprocessor 115. By use of the information items, the multiplexer 116 multiplexes the signals according to a predetermined format. When a still picture is shot, the audio signal is not obtained in an ordinary case. However, it is also possible to multiplex an audio signal in synchronism with the still picture shooting operation.

The information items from the microprocessor 115 include, for example, positional information (horizontal positions, vertical positions on the right, and vertical positions on the left), date, and exposure information at shooting.

In FIG. 1, the multiplexed signal from the multiplexer 116 is fed via an encryption/decryption circuit 140 to be stored in a storage 130. The storage 130 may be, for example, a hard disk device, an optical disk device, or a semiconductor memory device. The type of the storage 130 may be determined according to, for example, a storage capacity, a size of the storage 130, easiness of removing a storage medium, and/or a price of the storage 130 according to necessity. It is also possible to store the multiplexed signal via a signal processing circuit 124 and a memory interface 120 in a memory 121.

When information is shot by a particular person, copyright of the information belongs to the person. Hence, ordinarily, such information is not required to be encrypted for the storage thereof. However, the storage medium having stored information by the storage 130 may be lost. It will be more safe if the multiplexed signal from the multiplexer 116 is once encrypted by the encryption/decryption circuit 140 to be stored in the storage 130 or the memory 121.

The video processing apparatus 100 may also support the use of a removable memory or include a cellular phone function or a radio Local Area Network (LAN) function. The memory interface 120 is an interface for a removable memory 121. When video and audio contents of still and moving pictures are recorded by another apparatus in the memory 121 and the memory 121 is connected to the interface 120, the contents can be recorded via the signal processing circuit 124 and the encryption/decryption circuit 140 into the storage 130.

In this situation, the signal processing circuit 124 checks to determine whether or not the copyright of the contents recorded in the memory 121 is protected and whether or not the duplication thereof is prohibited. According to the detected condition, the encryption/decryption circuit 140 encrypts the contents and moves the encrypted contents in the storage 130.

Similarly, audio and video contents of still and moving pictures are received as inputs by a radio interface 122. The contents are stored via the signal processing circuit 124 and the encryption/decryption circuit 140 in the storage 130. Also, according to conditions of the copyright protection and the replication restriction, the contents are encrypted by the encryption/decryption circuit 140, as required.

When it is desired to reproduce a content stored in the storage 130 to view the reproduced content, the user selects the content by an input key or a remote control, not shown. The selected content is read from the storage 130 to be decoded by the encryption/decryption circuit 140 and is then separated by a demultiplexer circuit 141 into an audio signal and a video signal.

When a broadcast program is received by a broadcast receiver 180, the encrypted signal encrypted for the broadcast is decrypted by the encryption/decryption circuit 140. If encryption is required to store the signal, the signal is accordingly encrypted by the circuit 140 to be stored in the storage 130 and the memory 121. To immediately view the received broadcast program in real time, the signal is separated by the demultiplexer 141 into a video signal and an audio signal.

The separated and compressed video signal is decompressed by a decompression circuit 142 to be fed to a signal processing circuit 150. The circuit 150 conducts a scanning-line conversion for the video signal on the basis of the number of scanning lines of a display 160 to output the resultant video signal to the display 160. The separated and compressed audio signal is decompressed by a decompression circuit 143 to be delivered to an audio output device 161. Since the video processing apparatus 100 includes the display 160 and the audio output device 161, it is possible to immediately view the broadcast program without externally connecting any video display apparatus. In a situation wherein the period of time required for the decompression varies between the video and audio signals and/or a time difference exists between the video display and the audio output due to presence or absence of the scanning-line conversion, if the audio signal is advanced in time relative to the video signal, the user particularly perceives an uncomfortable feeling. To overcome the difficulty, the audio signal is delayed, for example, in the decompression processing, namely, a lip-sync operation is carried out. This removes the uncomfortable feeling due to the difference in time between the video and audio signals.

Description will now be given of a situation wherein the video processing apparatus 100 is employed as a cellular phone. For example, a voice of a conversation is inputted to the audio input/output section 126 to produce an electric signal. For the signal, a telephone signal processing circuit 125 executes predetermined signal processing and modulation processing. The resultant signal is transmitted via an antenna, not shown, to a base station of the cellular phone. An audio signal sent from the base station is received by an antenna, not shown, to be fed to the telephone signal processing circuit 125. For the signal, the circuit 125 executes predetermined signal processing and demodulation processing. The resultant signal is fed to the audio I/O section 126 to be reproduced as a voice. The video processing apparatus 100 can also receive a content of a moving picture transmitted from the base station of the cellular phone. The content is received by an antenna, not shown, to be delivered via the telephone signal processing circuit 125 to the signal processing circuit 124. The content is similarly processed as above by the encryption/decryption circuit 140. The resultant signal of the content is fed to a display and an audio output unit incorporated in the video processing apparatus 100 to be viewed/listened by the user. The content thus processed may also be fed via a terminal 101, a connection cable 10, and a terminal 201 to an external video display apparatus 200 to be displayed on a large-sized screen. While viewing the content, it is possible to record the content in a recording medium incorporated in the video processing apparatus 100 or a recording medium, e.g., a memory 121 connected thereto, for example, to view the content later. The memory 121 may also be used as a recording medium to record a movie and the like.

Similarly, a program broadcast from a broadcast transmission tower is received by a broadcast receiver 180 of the video processing apparatus 100 to be viewed by the apparatus 100 or to be stored in a recording medium, not shown, incorporated in the apparatus 100 or a recording medium, e.g., the memory 121 connected thereto. Also, the content may be fed via the terminal 101, the cable 10, and the terminal 201 to the video display apparatus 200 to be viewed by the user.

In addition, by installing an imaging device 110 and a microphone 112 in the video processing apparatus 100, still and moving pictures can be shot together with audios and can be stored in an incorporated recording medium, not shown, and/or the memory 121. The videos and audios stored in the recording medium and/or the memory 121 may be fed via the terminal 101 to the video display apparatus 200 to be enjoyed by the user.

When the user views video and audio signals by use of the external video display apparatus 200, the apparatus 200 confirms scanning lines which the apparatus 200 can support. If the scanning lines match those of the video signals to be displayed, the signals are immediately outputted in real time. Otherwise, the scanning lines of the video signals are converted by a signal processing circuit 150 into the required scanning lines to be fed to a multiplexer circuit 170. In the circuit 170, the video signals are multiplexed on the time axis, with the audio signals processed by a signal processing circuit 151. The circuit 151 compresses the audio signals on the time axis during a period corresponding to the blanking period of the video signals and conducts a time adjusting operation to carry out the lip-sync operation according to the necessity. The video and audio signals multiplexed by the multiplexer circuit 170 are delivered to an encryption circuit 171. For the signals, the circuit 171 carries out encryption for the transmission of the signals between the video processing apparatus 100 and the video display apparatus 200 and outputs the resultant signals via a video interface circuit 131, a transmission rate assignment controller 1001, and the terminal 101 to the video display apparatus 200. On the other hand, the terminal 134 is connected to a network such as the internet as described above and is used to wirelessly communicate videos and other information items obtained from the network by use of a radio modem circuit 1003. The information from the network is demodulated by the circuit 1003 to be fed via the transmission rate assignment controller 1001 to an interface circuit 133 and is delivered therefrom to a microprocessor 115. The microprocessor 115 determines the type of the information from the network. If the information is, for example, a video stream compressed in a predetermined format, the microprocessor 115 feeds the video stream to the demultiplexer circuit 141 and the decompression circuit 143. For the video stream, the circuits 141 and 143 conduct processing as described above. The resultant signals are presented on the display 160. According to necessity, the audio information obtained from the network is reproduced by the audio output device 161. If the information from the network is an update program of an application program or an Operating System (OS), the microprocessor 115 executes addition and storage processing for new software or executes update processing for the associated program. Although the processing of the network information is executed by the microprocessor 115 to process video information in the embodiment, it is also possible to arrange a microprocessor to dedicatedly process the network information.

The controller 132 controls the transmission rate assignment control circuit 1001 on the basis of time control information of the video signal to variably control the transmission rate of the radio modem circuit 1002. At the same time, the controller 132 variably controls the transmission rate of the radio modem circuit 1003 for radio communication with a network such as the Internet. According to the embodiment, in the assignment of the transmission rate to the demodulation circuits 1002 and 1003, the controller 132 gives preference to the demodulation circuit 1002. In other words, the transmission rate of the demodulation circuit 1002 is more than that of the modem circuit 1003. Hence, within the limited range of bands for the radio transmission, the modem 1002 can transmit video information without deteriorating the video quality of the video information having high picture quality. The band of radio signals from the terminal 101 and that of radio signals from the terminal 134 are fixed. Therefore, if the band of signals from the terminal 101 is expanded, that of signals from the terminal 134 narrows to slightly lower the communication speed of the network. However, this rarely influences the system operation since information regarding the network is less frequently exchanged as compared with video information sent from the video processing apparatus 100.

When the signal from the terminal 101 is to be stored in the destination thereof, the compressed signal is transmitted without decompressing the signal. In the operation, the encryption/decryption circuit 140 delivers the compressed signal to the encryption circuit 171. The circuit 171 conducts predetermined encryption for the signal and then outputs the resultant signal via the video interface circuit 131, the transmission rate assignment controller 1001, and the terminal 101. Also in this situation, the control circuit 132 variably controls the transmission rate of the radio modem 1002 in association with the time control information of the video signal. As a result, the radio modem 1002 can send the video information without deteriorating the video quality of the video information having high picture quality.

In the description above, the video and audio signals obtained from the imaging device 110 and the microphone 112 and the contents inputted from the memory 121 and the radio interface 122 are once stored in the storage 130 to be thereafter reproduced. However, if the storing of the signals and the contents are not required or are immediately viewed, the signals and the contents are demultiplexed by the demultiplexer 141 without conducting the encryption and decryption for the storage by the encryption/decryption circuit 140. Resultantly, the videos and audios can be enjoyed by use of the display 160 and the audio output device 161 of the video processing apparatus 100. Also, it is possible to enjoy the videos and audios by a receiver externally connected via the wired interface circuit 131 to the apparatus 100.

Description will now be specifically given of one technical aspect of the embodiment, namely, the transmission rate assignment control circuit 1001 and the radio demodulation circuits 1002 and 1003. The modem circuits 1002 and 1003 conduct demodulation through Orthogonal Frequency Division Multiplexing (OFDM). In the example, the modem 1002 is a first radio communication unit which wirelessly sends video information and audio information to the external video display apparatus 200 and which receives data and information by radio therefrom. The modem 1002 is connected via the transmission rate assignment controller 1001 to the interface circuit 131 which communicates with the video display apparatus 200. On the other hand, the modem 1003 is a second radio communication unit which connects to (accesses) a network, e.g., the Internet or a home network to wirelessly communicate various information including video signals, audio signals, and data therewith. The modem 1003 is connected via the transmission rate assignment controller 1001 to the interface circuit 133 for networks. The controller 1001 variably controls, according to a control signal from the controller 132, the transmission rates respectively of the modems 1002 and 1003 by variably setting the modulation/demodulation methods, the frequency bands, and the number of carriers respectively for the modems 1002 and 1003. In short, the controller 132 controls distribution of the radio transmission rate of each modem by controlling the transmission rate assignment controller 1001. As a specific example of operation in which the transmission rate is controlled by changing parameters including the demodulation method and the frequency band, FIG. 9 shows the difference in the transmission rate between two schemes.

According to the embodiment, the controller 132 and the transmission rate assignment controller 1001 control the radio transmission assignment such that the radio transmission rate of the modem 1002 to send the video information of high picture quality by radio to the video display apparatus 200 takes precedence over the radio transmission rate of the modem 1003 to connect to a network for communication. That is, the radio transmission rate of the modem 1002 is more than that of the modem 1003. For example, in a situation wherein the modem 1002 transmits video information to the display apparatus 200 and the modem 1003 simultaneously connects to the Internet to receive Internet information, the controller 132 controls the operation to continuously supply videos with high picture quality to the user, specifically, to set the transmission scheme of the modem 1002 to, for example, "scheme 1" shown in FIG. 9. For the radio modem 1003, the controller 132 sets the transmission scheme thereof to "scheme 2" of FIG. 9. As can be seen from FIG. 9, the transmission capacity of scheme 1 is 17 Megabits per second (Mbps) which is more than three times that of scheme 2 (5 Mbps). As above, in the limited transmission capacity for radio transmission, a higher transmission rate is assigned to the communication with the display apparatus 200 in the embodiment. It is hence possible that the user continuously views videos with high picture quality on the display apparatus 100. Naturally, the variable control of the transmission rate is not limited to the example shown in FIG. 9.

The controller 132 and the transmission rate assignment controller 1001 may variably control the radio transmission assignment to the modems 1002 and 1003 in response to an indication from the user. For example, in a situation wherein the user issues an indication to transmit video information by radio via the modem 1002 to the display apparatus 200 while acquiring information from the Internet according to scheme 1 of FIG. 9 by use of the modem 1003, the controller 132 outputs a control signal to the assignment controller 1001 such that the transmission scheme of the modem 1003 is changed from scheme 1 to scheme 2 of FIG. 9 and that of the modem 1002 is set to scheme 1 of FIG. 9 conduct communications. The transmission rate of the modem 1002 may be variably changed according to fineness or precision of the video information sent from the modem 1002 to the display apparatus 200. For example, if the fineness of the video information is altered from SD (640×480) to HD (1980×1080), the controller 132 instructs the assignment controller 1001 to heighten the transmission rate of the modem circuit 1002. It is preferable in the operation that the transmission rate of the modem 1003 is lowered in association with the variable control of the transmission rate of the modem 1002.

The transmission rates of the radio modems 1002 and 1003 may also be variably controlled by a communication technique using a plurality of antennas such as a Multi-Input Multi-Output (MIMO) scheme.

Figure 4:
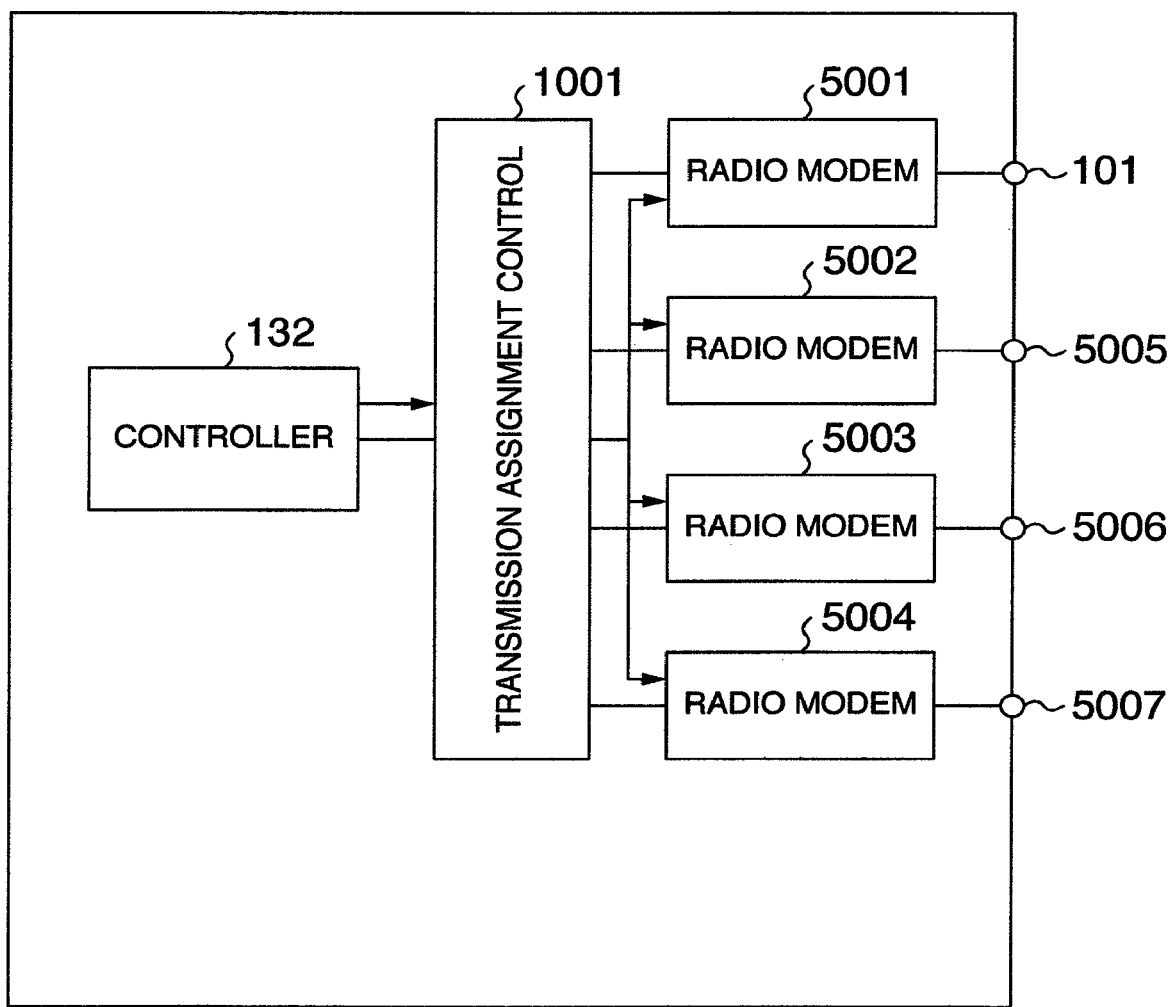
FIG. 4 is a diagram showing an example of a radio modulator and demodulator or modem of the video processing apparatus 100.

Referring next to FIG. 4, description will be given of other examples of the transmission rate assignment controller and the radio modem. FIG. 4 shows only part of the system associated with the transmission rate assignment control. In FIG. 4, the same functional constituent components as those of FIG. 1 are assigned with the same reference numerals.

In FIG. 4, radio modem circuits 5001 to 5004 are modems having respective fixed transmission capacity values and differ from each other only in the frequency band for transmission. The modems 5001 to 5004 respectively have bands A to D as shown in FIG. 11. Terminals 101 and 5005 to 5007 are input terminals to receive signals and are arranged respectively for radio modems 5001 to 5004. In operation, the modems 5001 to 5004 may be appropriately combined with each other. For example, according to necessity, the modems 5001 and 5002 are employed to transmit video information and the modems 5003 and 5004 are utilized to communicate with the network such as the Internet. That is, while the interface circuit 131 wirelessly transmits video information and audio information via the modems 5001 and 5002 to the video display apparatus 200, the interface circuit 133 conducts communication via the modems 5003 and 5004 with the network. In a situation wherein a wide band is required to transmit video information of high picture quality (e.g., video information of HD resolution), the modems 5001 to 5003 are assigned to send video information and only the modem 5004 is assigned to communicate with the network such as the Internet. Specifically, the interface circuit 131 transmits video and audio information by radio via the modems 5001 to 5003 to the display apparatus 200, and the interface circuit 133 communicates with the network via the modem 5004. As a result, video information of high picture quality can be continuously transmitted and it is also possible to communicate with the Internet. Particularly, the broadcast signal is required to be presented by synchronizing the time information sent from the broadcasting station with that on the receiver side. According to the present invention, the time information can be appropriately controlled without deteriorating the quality of the video information.

Figure 2:
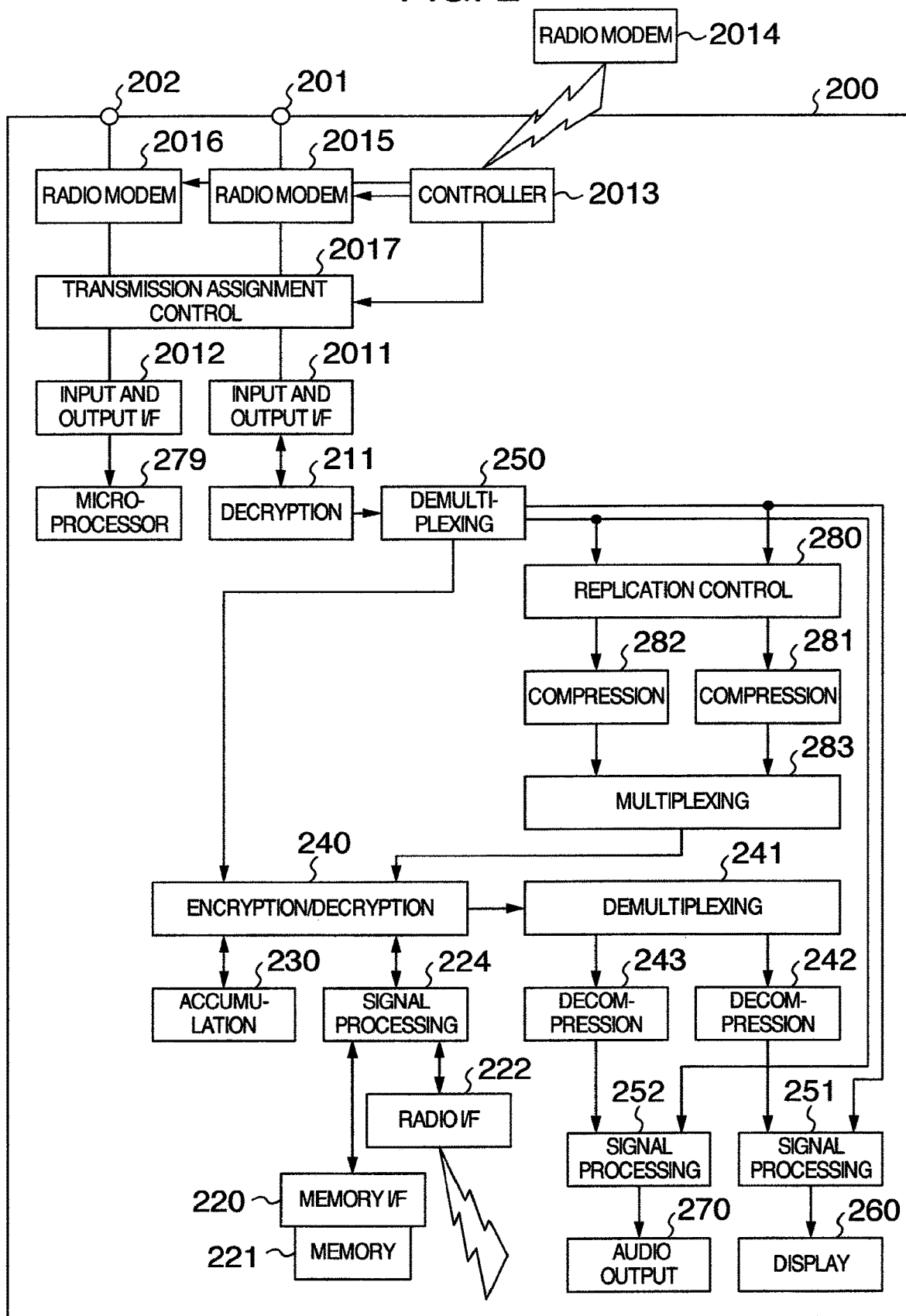
FIG. 2 is a block diagram showing an example of an embodiment of a video display apparatus 200 according to the present invention.

FIG. 2 shows a specific configuration of the video display apparatus 200 of FIG. 10. In FIGS. 2 and 10, the same constituent components are assigned with the same reference numerals and detailed description thereof will be avoided. Description will be given of a situation wherein an uncompressed baseband signal of a moving picture is inputted via the terminal 201. The signal from the external video processing apparatus 100 thus received via the terminal 201 is demodulated by a radio modem circuit 2015 to be supplied via a transmission rate assignment controller 2017 and an input/output interface circuit 2011 to a decryption circuit 211. In operation, a controller 2013 drives the assignment controller 2017 to vary the transmission rate of the modem 2015 according to that of the video information delivered from the video processing apparatus 100. Resultantly, an input/output interface circuit 2011 can receive the video information of high picture quality at preset timing.

The decryption circuit 211 is associated with encryption by the encryption circuit 171 shown in FIG. 1 and decrypts a signal encrypted by the circuit 171. The decrypted signal is fed to a demultiplexer circuit 250, and then video and audio signals obtained from the demultiplexer 250 are inputted to signal processing circuits 251 and 252, respectively. For the received video signal, the circuit 251 conducts a scanning-line conversion and a resolution conversion according to the number of pixels displayable by a display 260. The circuit 252 decompresses on the time axis the audio signal which is compressed and multiplexed on the time axis by use of the blanking of the video signal. According to necessity, the circuit 252 carries out the lip-sync operation and the sound quality adjustment. Signals outputted respectively from the circuits 251 and 252 are inputted respectively to a display 260 and an audio input/output unit 270 to be viewed by the user.

Description will now be given of operation when a compressed moving-picture signal is received via the terminal 201. This operation aims at storing the moving-picture signal in a storage 230 incorporated in the apparatus 200.

The signal received from the terminal 201 is delivered via the wired input/output interface circuit 2011 to the decryption circuit 211. The circuit 211 corresponds to the encryption circuit 171 shown in FIG. 2 and decrypts a signal encrypted by the circuit 171. The decrypted signal is inputted to an encryption/decryption circuit 240. The circuit 240 reads copy control information of the content to be stored and encrypts the content for the storage thereof according to the information. The encrypted signal is stored in the storage 230 in the compressed state.

In a situation wherein the user views the compressed signal received via the terminal 201 while storing the signal in the storage, a signal corresponding to a compressed signal decrypted by the encryption/decryption circuit 211 is fed from the encryption/decryption circuit 240 to a demultiplexer circuit 241. In the circuit 241, the signal is separated into a compressed video signal and a compressed audio signal. The separated video and audio signals are decompressed respectively by decompression circuits 242 and 243 to baseband signals to be respectively supplied to the signal processing circuits 251 and 252. Signals outputted respectively therefrom are delivered respectively to the display and the audio output unit 270 to be viewed by the user.

When a content stored in the storage 230 is reproduced to be viewed by the user, information items such as titles of the contents stored in the storage 230 are presented on the display 260. When the user selects one of the contents, a signal of the selected content is fed from the storage 230 to the encryption/decryption circuit 240. The circuit 240 decrypts the encrypted signal of the content to input the resultant signal to the demultiplexer 241. The signal of the content is thereafter similarly processed as described above to be viewed by the user.

It is possible to similarly reproduce contents stored in a memory 221. As in the reproduction of contents stored in the storage 230, the user selects one of the contents stored in a memory 221 to view the content. The selected content is transferred via a memory interface 220 and a signal processing circuit 224 to the encryption/decryption circuit 240. Specifically, the circuit 224 executes processing necessary to read the content from the memory 221 to input compressed and multiplexed video and audio signals of the content to the circuit 240. Subsequent signal processing is similar to the processing executed after the content is read from the storage 230.

As in the operation to store a content in the storage 230, it is possible to store the content in the memory 221. Although detailed description of the associated processing will be avoided, the content encrypted by the encryption/decryption circuit 240 is stored via the signal processing circuit 224 and the memory interface 220 into the memory 221.

To view or to store a content transmitted by radio, the system executes processing in a similar way. A compressed content received by radio is fed via a radio interface 222 and the signal processing circuit 224 to the encryption/decryption circuit 240. The circuit 240 decrypts the signal encrypted for the radio transmission. Subsequent processing is similar to the processing executed at reproduction of the signal from the storage 230.

When an uncompressed baseband signal is received from the terminal 201 or 202, the content can be efficiently stored in the storage 230 and the memory 221. Description will be given of operation in this situation.

The content inputted from the terminal 201 is transferred via the input/output interface 2011, the decryption circuit 211 and the demultiplexer circuit 250 to be separated into a video signal and an audio signal. The video and audio signals thus separated are fed via a replication control circuit 280 to compression circuits 281 and 282. The circuit 280 reads, from the content, multiplexed replication control information to determine whether or not replication of the content is allowed. As the control information, a bit may be assigned to a designated field. Or, by using electronic watermark, the information may be superimposed onto video or audio information. Information inputted from the network to the terminal 202 is also processed in a similar fashion as above.

The compression circuit 281 compresses the video signal by use of a compression scheme, e.g., MPEG2, MPEG4, or AVC/H.264. The compression circuit 282 compresses the audio signal according to a compression scheme, e.g., MPEG Audio. The compressed video and audio signals are inputted to a multiplexer circuit 283 to be multiplexed. The multiplexed signal is fed to the encryption/decryption circuit 240 to be thereafter similarly stored in the storage 230 and/or the memory 221. As a result, the content can be efficiently recorded therein for a long period of time according to copyright information.

On the other hand, the signal from a network such as the Internet received via the terminal 202 is demodulated by a radio modem circuit 2016 to be supplied via a transmission rate assignment controller circuit 2017 and an input/output interface circuit 2012 to a microprocessor 279. The type of information of the video information from the network is determined. If the information is, for example, a video stream compressed in a predetermined format, the system transfers the information to demultiplexer circuit 241 and the decompression circuits 242 and 243. After the information is processed by these circuits in a similar way as described above, an image of the information is presented on the display 260. According to necessity, audio information obtained from the network is reproduced by the audio output unit 261. If the information from the network is an update program for an application program, an operating system OS, or the like, the microprocessor 279 adds and stores new software and/or updates an associated program. It is also possible that the function of the microprocessor 279 is installed in the controller 2013 to configure one unified module including the microprocessor 279 and the controller 2013.

In the operation, the controller 2013 controls the transmission rate assignment controller 2017 to vary the transmission rate of the radio modem 2015 in association with the transmission rate of the video information received from the video processing apparatus 100. Since the transmission rate of the radio modem 2015 to receive the video information from the apparatus 100 takes precedence over that of the modem 2016 in the transmission rate assignment, the transmission rate of the modem 2016 is lower than that of the modem 2015. In the embodiment as described above, the transmission rate of the modem 2015 to receive the video information from the apparatus 100 is higher than that of the modem 2016 to communicate with the network. Therefore, within the limited range of bands for the radio transmission, it is possible to obtain the high-quality video information from the external video processing apparatus 100 without deteriorating the video quality. The band of radio signals received by the terminal 201 and that of radio signals inputted to the terminal 202 are fixed. Hence, if the band of signals from the terminal 201 is expanded, that of signals from the terminal 202 narrows. This slightly lowers the communication speed of the network. However, this rarely influences the system operation since information regarding the network is less frequently exchanged as compared with video information sent from the video processing apparatus 100.

Next, description will be specifically given of one technical aspect of the embodiment, namely, the transmission rate assignment controller 2017 and the radio modems 2015 and 2016. The modems 2015 and 2016 carry out OFDM modulation/demodulation. In the example, the modem 2015 is a first radio communication unit which wirelessly receives video information and audio information from the external video processing apparatus 100 and which sends data and information by radio to the apparatus 100. The modem 2015 is connected via the transmission rate assignment controller 2017 to the interface circuit 2011 which communicates with the video display apparatus 200. On the other hand, the modem 2016 is a second radio communication unit which connects to (accesses) a network, e.g., the Internet or a home network to wirelessly communicate various information including video signals, audio signals, and data with the network. The modem 2016 is connected via the transmission rate assignment controller 2017 to the interface circuit 2012 for networks. The controller 2017 variably controls, according to a control signal from the controller 2013, the transmission rates respectively of the modems 2015 and 2016 by variably designating the modulation/demodulation methods, the frequency bands, and the number of carriers respectively for the modems 2015 and 2016. In other words, the controller 2013 controls distribution of the radio transmission rate of each modem by controlling the transmission rate assignment controller 2017. As a specific example of operation in which the transmission rate is controlled by changing parameters including the demodulation method and the frequency band, FIG. 9 shows the difference in the transmission rate between two schemes.

In the embodiment, the controller 2013 and the transmission rate assignment controller 2017 control the radio transmission rate assignment so that the radio transmission rate of the modem 2015 to receive the video information of high picture quality by radio from the external video processing apparatus 100 takes precedence over the radio transmission rate of the modem 2016 to connect to a network for communication. In short, the radio transmission rate of the modem 2015 is more than that of the modem 2016. For example, in a situation wherein the modem 2015 receives video information from the video processing apparatus 100 and the modem 2016 simultaneously connects to the Internet to receive Internet information, the controller 2013 controls the operation to continuously provide videos with high picture quality to the user, specifically, to set the transmission scheme of the modem 2015 to, for example, "scheme 1" shown in FIG. 9. For the radio modem 2016, the controller 2013 sets the transmission scheme thereof to "scheme 2" shown in FIG. 9. As can be seen from FIG. 9, the transmission capacity of scheme 1 is 17 Mbps which is more than three times that of scheme 2 (5 Mbps). Hence, in the limited transmission capacity for radio transmission, a higher transmission rate is assigned to the communication with the video processing apparatus 100 in the embodiment. It is therefore possible that the user continuously watches videos with high picture quality on the display apparatus 100. Naturally, the variable control of the transmission rate is not limited to the example shown in FIG. 9.

The controller 2013 and the transmission rate assignment controller 2017 may control the radio transmission assignment to the modems 2015 and 2016 in response to an indication from the user. For example, in a situation wherein the user issues an indication to receive video information by radio via the modem 2015 from the video processing apparatus 100 while acquiring information from the Internet according to scheme 1 of FIG. 9 by use of the modem 2016, the controller 2013 outputs a control signal to the assignment controller 2017 such that the transmission scheme of the modem 2016 is changed from scheme 1 to scheme 2 of FIG. 9 and that of the modem 2015 is set to scheme 1 of FIG. 9. The transmission rate of the modem 2015 may be changed according to precision of the video information which is sent from the video processing apparatus 100 to be received by the modem 2015. For example, the precision of the video information above is changed from SD (640×480) to HD (1980×1080), the controller 2013 instructs the assignment controller 2017 to heighten the transmission rate of the modem circuit 2015. It is preferable in the operation that the transmission rate of the modem 2016 is lowered in association with the variable control of the transmission rate of the modem 2015.

The transmission rates of the radio modems 2015 and 2016 may also be variably controlled by a communication technique using a plurality of antennas such as the MIMO scheme.

Figure 8:
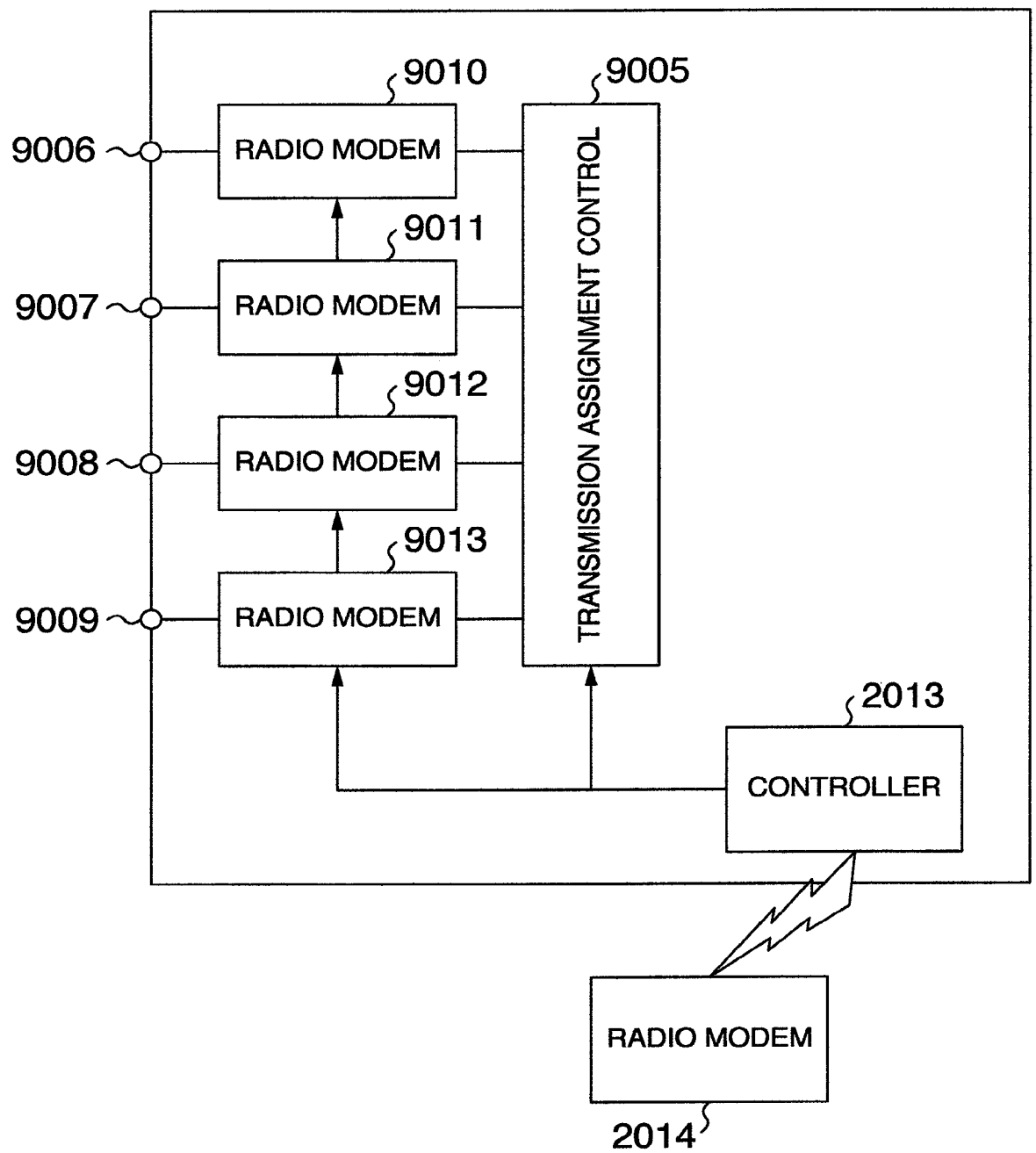
FIG. 8 is a diagram showing an example of a radio modem of the video display apparatus.

Referring next to FIG. 8, description will be given of other examples of the transmission rate assignment controller and the radio modem. FIG. 8 shows only part of the system associated with the transmission rate assignment control. In FIG. 8, the same functional constituent components as those of FIG. 1 are assigned with the same reference numerals.

In FIG. 8, a transmission rate assignment controller 9005 operates in a similar way as the transmission rate assignment controller 1001 described above and assigns transmission rates respectively to radio modems 9010 to 9013 according to an instruction from the controller 2013. The modem circuits 9010 to 9013 are modems having respective fixed transmission capacity values and differ from each other only in the frequency band for transmission. The modems 9010 to 9013 respectively have bands A to D as shown in FIG. 11. Terminals 9006 and 9007 are input terminals to receive signals and are arranged respectively for radio modems 9010 to 9013. In operation, the modems 9010 to 9013 may be appropriately combined with each other. For example, under supervision of the assignment controller 9005, the modems 9010 and 9011 are employed to transmit video information and the modems 9012 and 9013 are utilized for communication with the network such as the Internet depending on cases. That is, while the interface circuit 2011 transmits by radio video information and audio information via the modems 9010 and 9011 to the video display apparatus 200, the interface circuit 2012 communicates via the modems 9012 and 9013 with the network. In a situation wherein a wide band is required to receive video information of high picture quality (e.g., video information of HD resolution) from the video processing apparatus 100, the modems 9010 to 9012 are allocated to transmit video information and only the modem 9013 is allocated to communicate with the network such as the Internet. That is, the interface circuit 2011 transmits video and audio information by radio via the modems 9010 to 9012 to the video display apparatus 200, and the interface circuit 2012 communicates with the network via the modem 9013. Resultantly, video information of high picture quality can be continuously transmitted and it is also possible to communicate with the Internet. In particular, the broadcast signal is required to be presented by synchronizing the time information sent from the broadcasting station with that on the receiver side. According to the embodiment, the time information can be appropriately controlled without deteriorating the quality of the video information.

Figure 7:
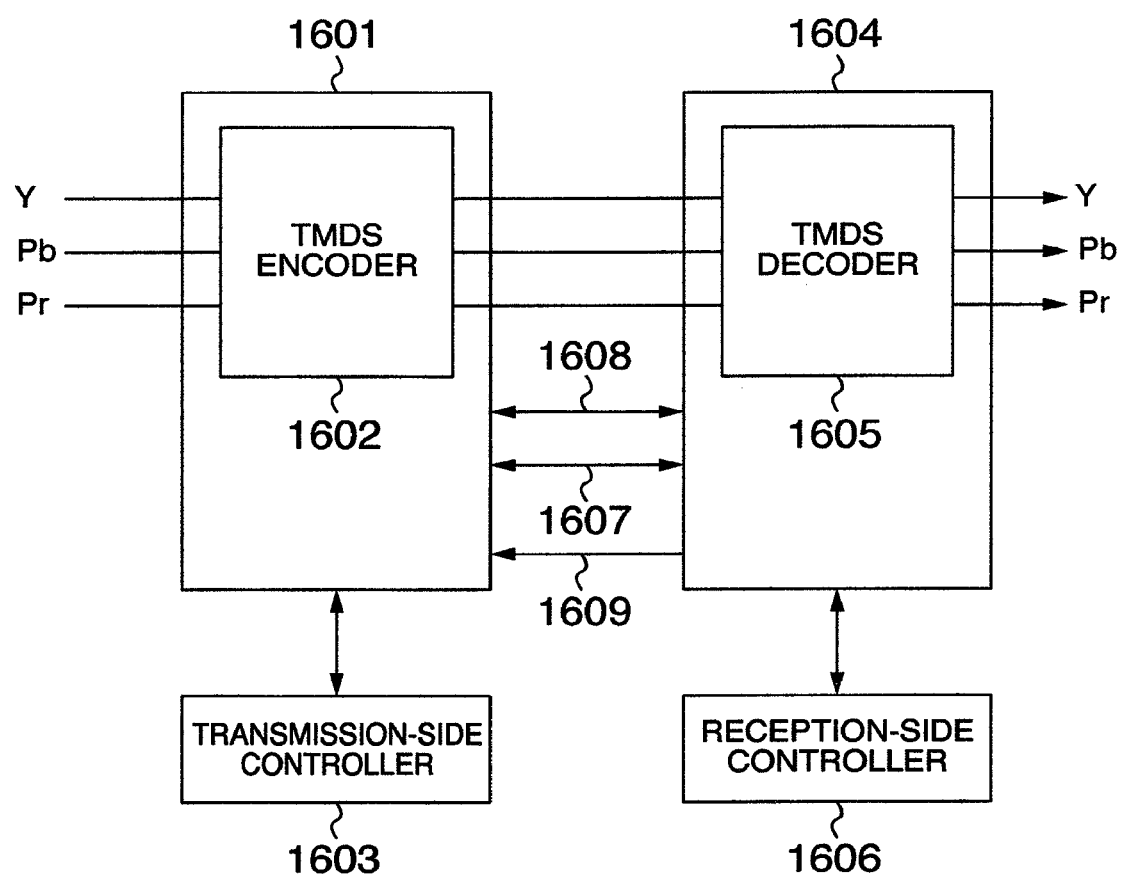
FIG. 7 is a diagram showing an example of structure of the HDMI.

Description will now be given supplementally of the High Definition Digital Multimedia Interface (HDMI). FIG. 7 shows an example the HDMI configuration mainly including a transmission side and a reception side. The transmission side includes a transmitter section 1601 and a transmission controller section 1603 to control the transmitter section 1601. The transmitter section 1601 encodes a video signal (Y, Pb, Pr) and an audio signal to output resultant signals to a receiver section 1604. Also, the transmitter section 1601 includes a TMDS encoder circuit 1602 which converts the video signal (Y, Pb, Pr) and the audio signal respectively into serial video data and serial audio data. On the other hand, the reception side includes a receiver section 1604 and a reception controller section 1606 to control the receiver section 1604. The receiver section 1604 receives the video data and the audio data from the transmitter section 1601 and conducts a TMDS decoding operation for the data by a TMDS decoder circuit 1605 to thereby reproduce baseband video data and baseband audio data. A CEC line 1607 is an apparatus control line to transmit a control signal for apparatuses. Display specification information known as "DDC" is transmitted via a DDC line 1608. The reception side transmits to the transmission side a Hot Plug Detect (HPD) signal 1609 indicating that a connection is established between apparatuses of the transmission and reception sides.

To conduct transmission according to the HDMI standard, apparatuses mutually recognize in a procedure as follows. A physical address is obtained via the DDC line. The physical address is an identification number to discriminate an associated apparatus. By use of a CEC bus for bidirectional connection, a logical address is obtained for bidirectional communication of each apparatus. The logical address is identification information defining a category of each apparatus, e.g., a display or a recording apparatus.

Figure 5:
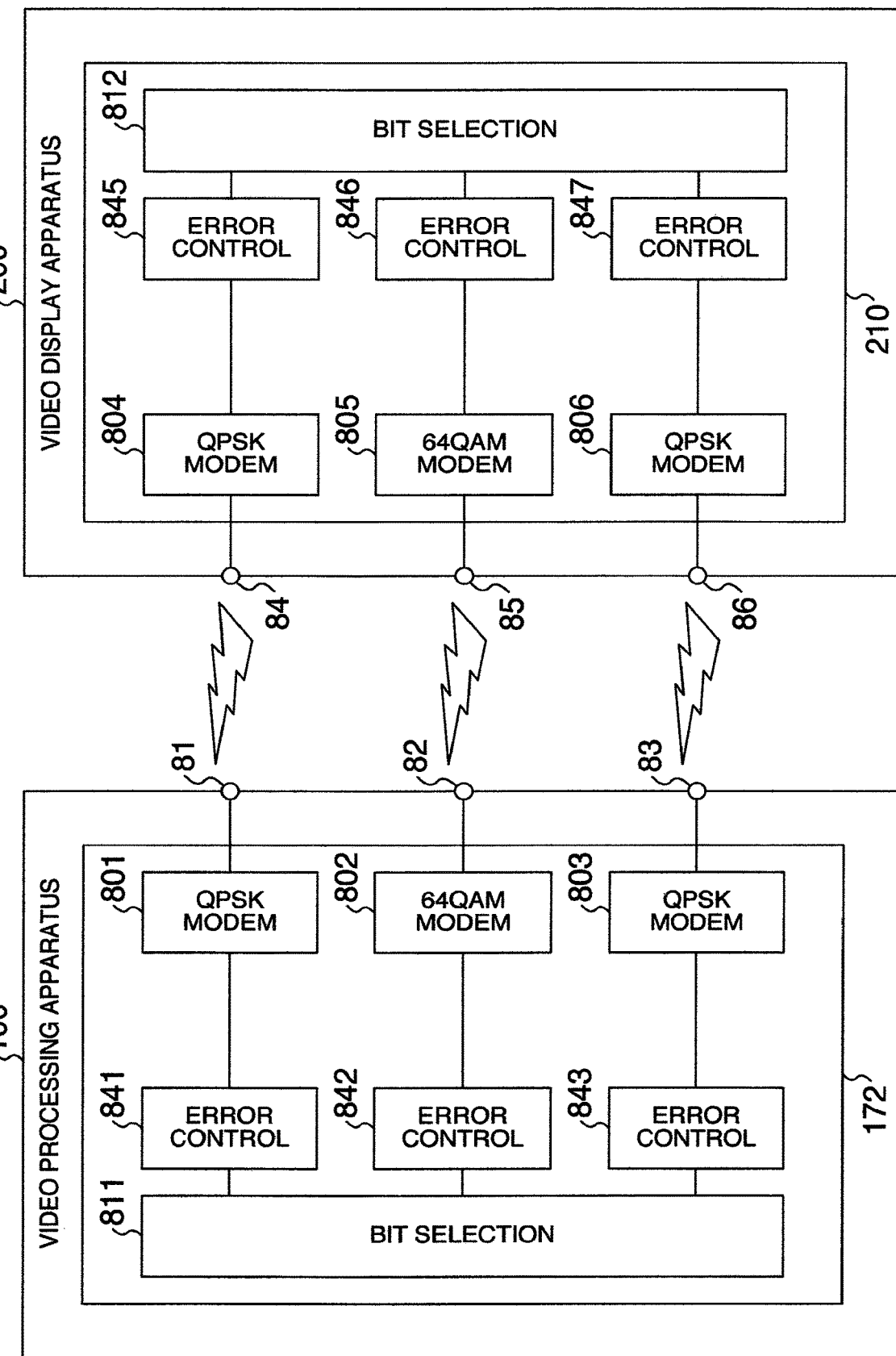
FIG. 5 is a block diagram showing an example of a system in which two video processing apparatuses are wirelessly connected to each other.

FIG. 5 is a diagram to supplementally explain a radio interface 11 between the video processing apparatus 100 and the video display apparatus 200. In FIG. 5, the apparatuses 100 and 200 are almost the same as those described in conjunction with, for example, FIG. 1. To simplify explanation, for the constituent components of the apparatus 100, only the radio interface circuit 133 is shown in FIG. 8 and the other constituent components are not shown. For the constituent components of the display apparatus 200, only the radio input/output interface circuit 2012 is shown and the other constituent components are not shown. The interface circuits 133 and 2012 are bidirectional interfaces.

In FIG. 5, a channel between antennas 81 and 84 and a channel between antennas 82 and 85 are channels to bidirectionally transmit a video signal, an audio signal, and control signals indicating copyright protection and a replication restriction condition of contents. On the other hand, a channel between antennas 83 and 86 is disposed to transmit an inter-apparatus control signal. Bit selection circuits 811 and 812 receive the video signal, the audio signal, the control signals indicating copyright protection and a replication restriction condition of contents, and the inter-apparatus control signal. In the demodulation, the QPSK demodulation scheme is more resistive against transmission errors as compared with the 64QAM demodulation scheme. For the transmission efficiency, the 64QAM demodulation scheme is superior to the QPSK demodulation scheme. Description will now be given of a situation wherein a video signal, an audio signal, and control signals indicating copyright protection and a replication restriction condition of contents are fed from the video processing apparatus 100 to the video display apparatus 200. Assume in the operation that the transmission direction from the apparatus 100 to the apparatus 200 is an uplink direction and the transmission direction from the apparatus 200 to the apparatus 100 is an downlink direction.

To transmit information, the video processing apparatus 100 determines, by a carrier detector circuit, not shown, a state of an associated transmission path, i.e., whether or not the channel is reserved for another apparatus. In the carrier detection, a check is made to determine whether or not a carrier is detected in a predetermined frequency band for a predetermined period of time. If it is detected by the detector that the channel is occupied by another apparatus, the check is again carried out after a lapse of a predetermined period of time to determine whether or not an available channel is present. If such available channel is present, the condition is notified to the microprocessor 115 of the video processing apparatus 100. The microprocessor 115 outputs from a QPSK modem circuit 803 a channel use request signal as an inter-apparatus control signal to secure the channel use right. Thereafter, the microprocessor 115 sends a transmission request signal to a bit selection circuit 811. An error control circuit 843 adds an error control bit for error detection and correction to the transmission request signal and then transfers the signal to the QPSK modem 803. The modem 803 conducts a QPSK modulation for the signal to resultantly transmit a radio signal via the antenna 83 to the display apparatus 200. The apparatus 200 then receives the radio signal by the antenna 86, carries out a QPSK demodulation for the signal by a QPSK modem 806, conducts error detection and correction control for the demodulated signal by an error control circuit 847 to produce an inter-apparatus control signal, and delivers the signal to the bit selection circuit 812.

The microprocessor in the video display apparatus 200 decodes the inter-apparatus control signal and receives the transmission request signal from the video processing apparatus 100 together with apparatus category information regarding the apparatus 100 (information to identify a category indicating whether the associated apparatus is a display apparatus or a recording apparatus) and an apparatus identification number of the apparatus 100. An image to urge the user to determine whether or not a connection is established to the video processing apparatus 100 is presented on a display screen of the display apparatus 200. In response thereto, the user indicates allowance for the connection by using an input device such as a remote controller of the display apparatus 200. Thereafter, between the apparatuses 100 and 200, the apparatus category information and the identification number to identify each of the apparatuses are communicated to exchange information to observe the copyright protection and the replication restriction condition of the content. If there does not exist any problem, it is allowed that the apparatuses 100 and 200 are connected to each other. In a situation wherein the connection is meaningless, for example, each of the apparatuses 100 and 200 is an input or output dedicated unit or the copyright protection or the replication restriction condition of the content is not observed, the connecting operation is interrupted and an indication of the condition is displayed on the apparatuses 100 and 200. Description will now be given of a situation wherein the copyright protection and the replication restriction condition of the content are observed.

By using the video signal, the audio signal, and the control signal indicating the copyright protection and the replication restriction condition of the contents associated with the video and audio signals which are inputted to an interface circuit 172, two bits are selected from the Most-Significant Byte (MSB) of the video signal so that error detection and correction control bits are added thereto by an error control circuit 841 and the resultant signal is fed to a QPSK modem circuit 801. The modem circuit 801 conducts a QPSK modulation for the signal and then transmits an associated radio signal from the antenna 81. To the remaining third to eighth bits, an error control circuit 842 adds error detection and correction control bits to send the resultant signal to a 64QAM modem circuit 802. The modem 802 carries out a 64QAM modulation for the signal and resultantly transmits a radio signal from the antenna 82.

In the video display apparatus 200, a QPSK modem circuit 804 conducts a QPSK demodulation for the signal received via the antenna 84 and an error control circuit 845 carries out error control for the resultant signal to output two high-order bits of the video signal to the bit control circuit 812. For the remaining signals received via the antenna 85, a 64QAM modem circuit 805 conducts a 64QAM demodulation. For the resultant signal, an error control circuit 846 carries out error control to output the obtained signal to the bit control circuit 812.

Description will now be given of the inter-apparatus control signal. When an inter-apparatus control signal is sent in a downlink direction, i.e., from the video display apparatus 200 to the video processing apparatus 100, the signal is fed from the bit selection circuit 812 via the error control circuit 847 to the QPSK modem circuit 806 to be demodulated. The demodulated signal is delivered from the antenna 86. The video processing apparatus 100 receives the signal by the antenna 83 to send the signal to the QPSK modem circuit 803. For the signal, the circuit 803 conducts a QPSK demodulation. For the demodulated signal, an error detection and correction is carried out by the error control circuit 843 to feed the resultant signal to the bit selection circuit 811. Conversely, when an inter-apparatus control signal is transmitted in an uplink direction, i.e., from the video processing apparatus 100 to the video display apparatus 200, the signal is fed from the bit selection circuit 811 via the error control circuit 843 to the QPSK modem circuit 803 to be modulated. The modulated signal is outputted from the antenna 83. The display apparatus 200 receives the signal by the antenna 86. For the signal, the modem 806 conducts a QPSK demodulation. For the demodulated signal, the error control circuit 847 conducts an error detection and correction to send the resultant signal to the bit selection circuit 812. By virtue of the operation, there is obtained an advantage that for the inter-apparatus control signal which is important to construct the system, an erroneous operation is less frequently occurs even in a noisy environment.

In the configuration of the embodiment, for two high-order bits of the digital signal, there can be conducted the transmission highly resistive against noise with a relatively low transmission rate. That is, by using the fact that higher order bits of a video signal more strongly affect the picture quality, two bits are taken out from the video signal in order of MSB and a transmission path using the QPSK modulation is allocated to the information of these two bits, to thereby preventing deterioration of the picture quality. In a system in which the audio information is more important than the video information, the transmission path using the QPSK modulation may be allocated to important bits, e.g., two high-order bits of the audio signal.

When a human perceives an image on a screen, a higher-frequency is less influential as compared with a lower-frequency component for the frequency component in the horizontal direction of the screen and that in the vertical direction thereof. For a moving object on the screen, it is likely that the human eyes cannot appropriately follow a high-speed movement of the object. By using these tendencies, it is also possible that in the horizontal direction of the screen, the signal is subdivided into a lower-frequency component and a higher-frequency component so that the QPSK modulation is used for the lower-frequency component and the 64QAM modulation is employed for the higher-frequency component. As a result, within the limited transmission bands, the noise resistivity can be increased for important information and the overall transmission capacity is secured. Similarly, it is possible that in the vertical direction of the screen, the signal is subdivided into a lower-frequency component and a higher-frequency component so that the QPSK modulation is used for the lower-frequency component and the 64QAM modulation is employed for the higher-frequency component. Resultantly, within the limited transmission bands, it is possible to heighten the noise resistivity for important information and the overall transmission capacity is secured. Additionally, by combining the operation for the frequency component in the horizontal direction of the screen with that for the frequency component in the vertical direction of the screen, the noise resistivity can be strengthened for desired important information.

In the description above, the error control circuits 841 to 843 add the error control information items to the bits inputted respectively thereto. However, it is also possible that the bits inputted to the circuits 841 to 843 are collectively treated as one word to add error control information to the word. This advantageously leads to a simplified configuration of the error control circuits.

Figure 6:
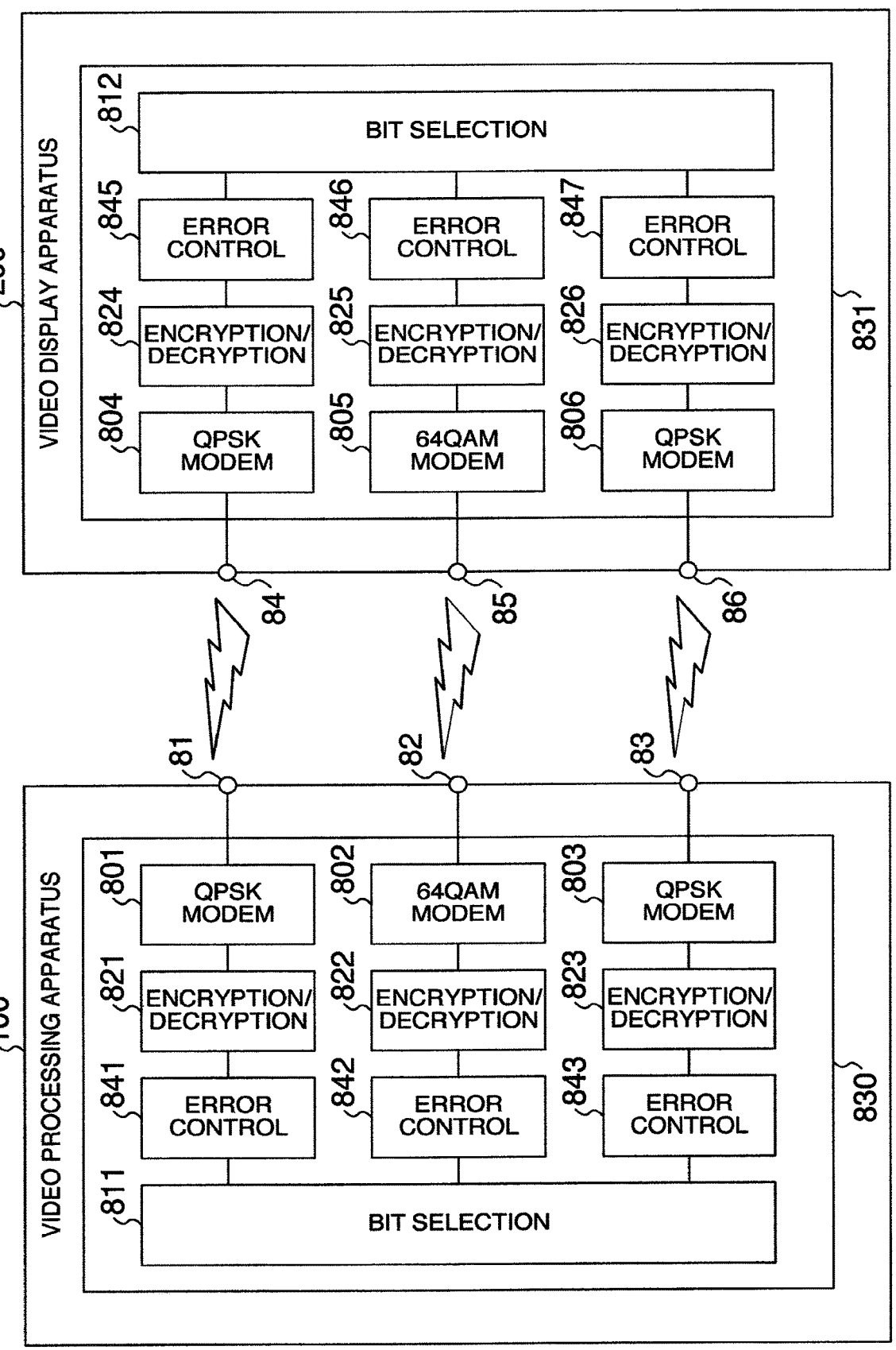
FIG. 6 is a block diagram showing another example of a system in which two video processing apparatuses are wirelessly connected to each other.

Although detailed description has not been given of the encryption in the embodiment shown in FIG. 5, it is possible to execute the processing as shown in FIG. 6 by combining the encryption circuit 171 with the interface circuit 172. FIG. 6 shows an example of the configuration to carry out the encryption in the system of FIG. 5. The system shown in FIG. 6 includes encryption/decryption circuits 821 to 826, interface circuits 830 and 831 including encryption, and error control circuits 841 to 847.

In the example of FIG. 6, the bit selection circuit 811 selects predetermined bits as in the example shown in FIG. 5. For the respective bits, the error control circuits 841 and 842 conduct error control. For the resultant signals, the encryption/decryption circuits 821 and 822 respectively carry out encryption. The obtained signals are inputted respectively to the QPSK modem circuit 801 and the 64QAM modem circuit 802 to be demodulated. The signals demodulated respectively by the circuits 801 and 802 are delivered to the encryption/decryption circuits 824 and 825 to be decrypted. The decrypted signals are fed to the bit selection circuit 812 and are therein bit-combined with each other. As a result, the signal processing can be executed according to importance of signals to possibly suppress errors in the processing of more important information. Hence, the signals of information can be efficiently transmitted without deteriorating the picture quality.

It is also possible to further increase transmission efficiency by combining lossless coding with the encryption/decryption circuits 821 to 826. For example, in the example of FIG. 6, before executing the encryption processing in the encryption/decryption circuits 821 to 823, the number of bits to be transmitted is reduced, for example, by use of reversible arithmetic codes based on a statistic property. In the video display apparatus 200, the received signals are decrypted by the encryption/decryption circuits 824 to 826. Thereafter, the reversible codes corresponding to the circuits 821 to 823 are decoded to be fed to the error control circuits 845 to 846 for the error detection and correction thereof. The obtained signals are fed to the bit selection circuit 812 to be bit-combined with each other. Since the transmission rate of the information to be transmitted can be lowered by combining the reversible codes as above, the signal can be more efficiently transmitted.

Description will be supplementally given of the encryption. By using AES128 bit encryption in all encryption circuits for the encryption, it is possible to conduct the encryption with high safety for the protection of contents. Moreover, if the AES128 bit encryption is employed for the content encryption circuit 821 and the Data Encryption Standard (DES) encryption is used for the other encryption circuits, there can be easily constructed a system in which the protection of important contents and the processing efficiency are appropriately achieved.

It is also possible to construct a system in which a changeover operation is conducted between the baseband signal transmission and the compressed signal transmission in response to an inter-apparatus control signal. With the configuration, to transmit a compressed signal according to, for example, a content protection request, the error resistivity is enhanced on the transmission path by transmitting the signal using the QPSK modulation. To transmit the baseband signal, the transmission efficiency is increased by using the 64QAM modulation.

The operations of the video processing apparatus 100 and the video display apparatus 200 in FIG. 6 are basically similar to those of the apparatuses 100 and 200 shown in FIG. 5. To transmit a signal, the video processing apparatus 100 determines the state of an associated transmission path, specifically, detects by a carrier detection circuit, not shown, whether or not the channel to be used is occupied by another apparatus. In the carrier detection, a check is made to determined whether or not a carrier is detected in a predetermined frequency band for a predetermined period of time. If it is detected by the detector that the channel is occupied by another apparatus, the check is again carried out after a lapse of a predetermined period of time to determine whether or not an available channel is present. If such available channel is present, the condition is notified to the microprocessor 115 of the video processing apparatus 100. The microprocessor 115 outputs from the QPSK modem circuit 803 a channel use request signal as an inter-apparatus control signal to secure the channel use right. Thereafter, the microprocessor 115 sends a transmission request signal to a bit selection circuit 811.

The error control circuit 843 adds error control bits for error detection and correction to the transmission request signal which is in turn encrypted by an encryption/decryption circuit 823 and then transferred to the QPSK modem 803. The modem 803 conducts a QPSK modulation for the signal to resultantly transmit a radio signal via the antenna 83 to the display apparatus 200. The apparatus 200 then receives the radio signal by the antenna 86, carries out a QPSK demodulation for the signal by the modem 806, and decrypts the signal by the encryption/decryption circuit 826. For the demodulated signal, the error control circuit 847 conducts error detection and correction control to produce an inter-apparatus control signal and delivers the signal to the bit selection circuit 812. The microprocessor in the video display apparatus 200 decodes the inter-apparatus control signal and receives the transmission request signal from the video processing apparatus 100 together with apparatus category information regarding the apparatus 100 (information to identify a category indicating whether the associated apparatus is a display apparatus or a recording apparatus) and an apparatus identification number of the apparatus 100. An image to urge the user to determine whether or not a connection is established to the video processing apparatus 100 is presented on a display screen of the display apparatus 200. In response thereto, the user indicates allowance for the connection by use of an input device such as a remote control of the display apparatus 200. Thereafter, between the apparatuses 100 and 200, the apparatus category information and the identification number to identify each of the apparatuses are communicated to exchange information to observe the copyright protection and the replication restriction condition of the content. If there does not exist any problem, it is allowed that the apparatuses 100 and 200 are connected to each other. In a situation wherein the connection is meaningless, for example, each of the apparatuses 100 and 200 is an input or output dedicated unit or the copyright protection or the replication restriction condition of the content is not observed, the connecting operation is interrupted and the status is displayed on the apparatuses 100 and 200. As above, in a situation wherein the copyright protection and the replication restriction condition of the content are observed, the connection is established to transmit video and audio signals from the video processing apparatus 100 to the video display apparatus 200.

Second Embodiment

Figure 3:
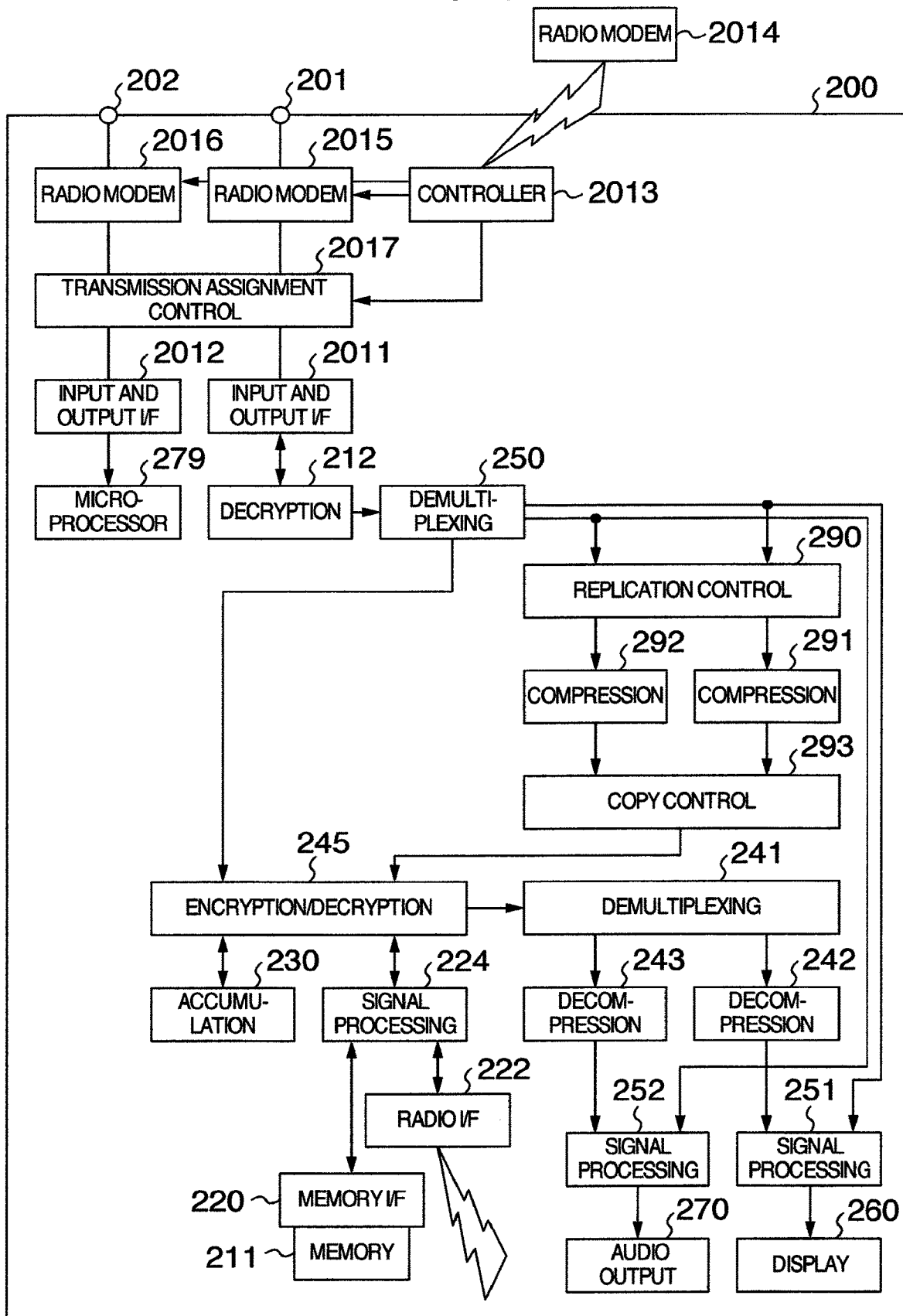
FIG. 3 is a block diagram showing another example of an embodiment of a video display apparatus 200 according to the present invention.

FIG. 3 shows a second embodiment of the present invention and is another configuration of the video display apparatus 200 shown in FIG. 1. The configuration of FIG. 3 is partially equal to that of FIG. 2. The same constituent components are assigned with the same reference numerals, and detailed description thereof will be avoided. The apparatus 200 of FIG. 3 includes a decryption circuit 212, encryption/decryption circuits 245 and 290, compression/transcoding circuits 291 and 292, and copy control circuit 293 which is a multiplexing circuit.

In the embodiment of FIG. 3, when a baseband signal is inputted via the terminal 201 or 202, the system operates in almost the same way as for the embodiment shown in FIG. 2. Each of the compression/transcoding circuits 291 and 292 operates as a compression circuit for the baseband signal. When a compressed signal is inputted from the terminal 201 or 202, the signal is fed via the input/output interface 210 to the encryption/decryption circuit 212 to be decrypted. The signal is then delivered to the demultiplexer circuit 250 to be separated into a compressed video signal and a compressed audio signal. These signals are inputted to the replication control circuit 290, which determines allowance or rejection of replication of the signals based on information indicating a replication restriction condition. If the replication is allowed, the bit rates of the compressed video and audio signals are lowered by the compression/transcoding circuits 291 and 292 by using, for example, a compression method having high compression efficiency according to necessity. Output signals from the circuits 291 and 292 are multiplexed by the multiplexer circuit 293 to be inputted to the encryption/decryption circuit 245. In this situation, if the replication is allowed by the replication control circuit 290, the circuit 245 encrypts the input signal for the storage thereof to store the encrypted signals in the storage 230 and/or the memory 221. To reproduce the stored signal, the circuit 245 decrypts the signal read from the storage 230 or the memory 221, and the decrypted signal is separated by the demultiplexer circuit 241 into a video signal and an audio signal. Thereafter, these signals are processed in almost the same way as described above and the user resultantly enjoys the image and the sound. In a situation wherein the user enjoys the image and the sound while storing the signal in the storage 230 or the memory 221, the signal from the multiplexer 293 is delivered via the encryption/decryption circuit 245 to the demultiplexer 241 to be processed almost in the same way as above. In this case, it is possible to confirm the picture quality of the transcoded signal. To enjoy the image and the sound without storing the signal, the signal is fed from the decryption circuit 212 via the circuit 245 to the demultiplexer 241 to be separated into a video signal and an audio signal. Thereafter, the signals are processed in substantially the same way as described above.

According to the embodiment of FIG. 3, also in a situation wherein a compressed signal is inputted thereto, by conducting the transcoding for the signal, the signal can be efficiently stored with a high compression ratio. Although the signal processing is carried out by use of circuits such as the compression circuits 111 and 113 in the embodiment, the circuits may be implemented by software means. In this situation, there can also be obtained similar advantages. According to the present invention, the signal processing may be accomplished in any appropriate fashion, that is, the present invention does not particularly limit how to implement the signal processing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for processing video information comprising:
transmitting video information by a first radio communicator via radio to an external device;
connecting a second radio communicator to a network via radio; and
controlling, by a controller, each of the first and second radio communicators in response to receiving an indication from a user,
wherein the controller controls each of the first and second radio communicators so that the first radio communicator transmits video information to the external device and the second radio communicator receives information which is different from the video information, from the network simultaneously, or wherein the controller controls each of the first and second radio communicators so that the first radio communicator transmits video information to the external device and the second radio communicator transmits information which is different from the video information, to the network simultaneously, and
wherein communication of the video information between the first radio communicator and the external device is maintained while the second radio communicator is connected to the network.

2. The method for processing video information according to claim 1, further comprising:
controlling, by the controller, assignment of connection for each of the first and second radio communicators.

3. The method for processing video information according to claim 1, further comprising:
assigning, by the controller, connection of the first radio communicator prior to connection of the second radio communicator.

4. The method for processing video information according to claim 1, further comprising:
generating, by an image sensor, video information;
accumulating, by a storage, video information generated by the image sensor; and
transmitting, by the first radio communicator, the video information accumulated in the storage to the external device.

5. The method for processing video information according to claim 1, further comprising:
a modulator, wherein the first radio communicator and the second radio communicator are different from each other in modulation method.

6. The method for processing video information according to claim 1, wherein the first radio communicator and second radio communicator are different from each other in frequency bandwidth.

7. A method for processing video information comprising:
transmitting video information by a first radio communicator via radio to an external device;
connecting a second radio communicator to a network via radio;
controlling, by the controller, each of the first and second radio communicators in response to receiving an indication from a user,
wherein the controller controls the second radio communicator to receive information which is different from the video information, from the network while transmitting the video information from the first radio communicator to the external device, or wherein the controller controls the second radio communicator to transmit information which is different from the video information, to the network while transmitting the video information from the first radio communicator to the external device, and
wherein communication of the video information between the first radio communicator and the external device is maintained while the second radio communicator is connected to the network.

8. The method for processing video information according to claim 7, further comprising:
controlling, by the controller, assignment of connection for each of the first and second radio communicators.

9. The method for processing video information according to claim 7, further comprising:
assigning, by the controller, connection of the first radio communicator prior to connection of the second radio communicator.

10. The method for processing video information according to claim 7, further comprising:
generating, by an image sensor, video information;
accumulating, by a storage, the video information generated by the image sensor; and
transmitting, by the first radio communicator, video information accumulated in the storage to the external device.

11. The method for processing video information according to claim 7, further comprising:
a modulator, wherein the first radio communicator and the second radio communicator are different from each other in modulation method.

12. The method for processing video information according to claim 7, wherein the first radio communicator and the second radio communicator are different from each other in frequency bandwidth.

13. A method for displaying video information, comprising:
receiving video information by a first radio communicator via radio from an external device;
connecting a second radio communicator to a network by radio;
displaying, by a display, video information; and
controlling, by a controller, each of the first and second radio communicators in response to receiving an indication from a user; wherein the controller controls each of the first and second radio communicators so that the first radio communicator receives video information from the external device and the second radio communicator transmits information which is different from the video information, to the network simultaneously, and
wherein the receiving the video information by the first radio communicator is maintained while the second radio communicator is connected to the network.

14. The method for displaying video information according to claim 13, further comprising:
controlling, by controller, assignment of connection for each of the first and second radio communicators.

15. The method for displaying video information according to claim 13, further comprising:
assigning, by the controller, connection of the first radio communicator prior to connection of the second radio communicator.

16. The method for displaying video information according to claim 13, further comprising:
a demodulator, wherein the first radio communicator and the second radio communicator are different from each other in demodulation method.

17. The method for displaying video information according to claim 13, wherein the first radio communicator and the second radio communicator are different from each other in frequency bandwidth.

18. A method for displaying video information, comprising:
receiving video information by a first radio communicator via radio from an external device;
connecting a second radio communicator to a network by radio;
displaying, by a display, video information; and
controlling, by a controller, each of the first and second radio communicators in response to receiving an indication from a user,
wherein the controller controls the second radio communicator to transmit information which is different from the video information, to the network while receiving the video information by the first radio communicator from the external device, and
wherein the receiving the video information by the first radio communicator is maintained while the second radio communicator is connected to the network.

19. The method for displaying video information according to claim 18, further comprising:
controlling, by the controller, assignment of connection for each of the first and second radio communicators.

20. The method for displaying video information according to claim 18, further comprising:
assigning, by the controller, connection of the first radio communicator prior to connection of the second radio communicator.

21. The method for displaying video information according to claim 18, further comprising:
a demodulator, wherein the first radio communicator and the second radio communicator are different from each other in demodulation method.

22. The method for displaying video information according to claim 18, wherein the first radio communicator and the second radio communicator are different from each other in frequency bandwidth.

23. A method for processing video information, comprising:
controlling, by a first controller, each of a first and a second radio communicator in response to receiving an indication from a user;
transmitting, by the first radio communicator, video information to a receiving apparatus by radio;
wherein the first controller controls each of the first and second radio communicators so that the first radio communicator transmits video information to the receiving apparatus and the second radio communicator receives information which is different from the transmitting video information, from a network simultaneously, or wherein the first controller controls each of the first and second radio communicators so that the first radio communicator transmits video information to the receiving apparatus and the second radio communicator transmits information which is different from the transmitting video information, to the network simultaneously,
wherein communication between the first radio communicator and the receiving apparatus is maintained while the second radio communicator is connected to the network; and
controlling, by a second controller, each of a third and a fourth radio communicator in response to receiving an indication from a user;
receiving, by the third radio communicator, video information from a video processing apparatus by radio,
wherein the second controller controls each of the third and fourth radio communicators so that the third radio communicator receives video information from the video processing apparatus and the fourth radio communicator transmits information which is different from the receiving video information, to the network simultaneously, and
wherein communication of the video information between the third radio communicator and the video processing apparatus is maintained while the fourth radio communicator is connected to the network.

24. A method for processing video information, comprising:
controlling, by a first controller, each of a first and a second radio communicator in response to receiving an indication from a user;
transmitting, by the first radio communicator, video information to a receiving apparatus by radio;
wherein the first controller controls the second radio communicator to receive information which is different from the video information, from a network while transmitting the video information from the first radio communicator to the receiving apparatus, or wherein the first controller controls the second radio communicator to transmit information which is different from the video information, to the network while transmitting the video information from the first radio communicator to the receiving apparatus,
wherein communication between the first radio communicator and the receiving apparatus is maintained while the second radio communicator is connected to the network,
controlling, by a second controller, each of a third and a fourth radio communicator in response to receiving an indication from a user; and
receiving, by the third radio communicator, video information from a video processing apparatus by radio,
wherein the second controller controls the fourth radio communicator to transmit information which is different from the video information, to the network while receiving the video information by the third radio communicator from the video processing apparatus, and
wherein communication of the video information between the third radio communicator and the video processing apparatus is maintained while the fourth radio communicator is connected to the network.

* * * * *